(12) United States Patent
Masuda et al.

(10) Patent No.: US 10,371,042 B2
(45) Date of Patent: Aug. 6, 2019

(54) UNIFLOW SCAVENGING TWO-CYCLE ENGINE

(71) Applicant: IHI Corporation, Tokyo (JP)

(72) Inventors: Yutaka Masuda, Tokyo (JP); Takahiro Kuge, Tokyo (JP); Takayuki Yamada, Tokyo (JP); Takeshi Yamada, Tokyo (JP); Jun Teramoto, Aioi (JP)

(73) Assignee: IHI CORPORATION, Tokyo (JP)

(*) Notice: Subject to any disclaimer, the term of this patent is extended or adjusted under 35 U.S.C. 154(b) by 152 days.

(21) Appl. No.: 15/450,227

(22) Filed: Mar. 6, 2017

(65) Prior Publication Data

US 2017/0175616 A1 Jun. 22, 2017

Related U.S. Application Data

(63) Continuation of application No. PCT/JP2015/080235, filed on Oct. 27, 2015.

(30) Foreign Application Priority Data

Oct. 30, 2014 (JP) .................................. 2014-221345
Nov. 4, 2014 (JP) .................................. 2014-224453

(51) Int. Cl.
*F02B 25/04* (2006.01)
*F02B 43/02* (2006.01)
(Continued)

(52) U.S. Cl.
CPC .............. *F02B 25/04* (2013.01); *F02B 23/10* (2013.01); *F02B 31/00* (2013.01); *F02B 43/02* (2013.01);
(Continued)

(58) Field of Classification Search
CPC .......... F02B 25/04; F02B 23/10; F02B 13/00; F02B 31/00; F02B 43/02; F02B 75/04;
(Continued)

(56) References Cited

U.S. PATENT DOCUMENTS 3,144,749 A * 8/1964 Miller ..................... F02B 25/04
60/599
3,309,865 A * 3/1967 Kauffmann ............... F01L 1/40
123/316

(Continued)

FOREIGN PATENT DOCUMENTS

EP 1 788 218 A2 5/2007
EP 2 687 707 A2 1/2014
(Continued)

*Primary Examiner* — David Hamaoui
*Assistant Examiner* — Susan E Scharpf
(74) *Attorney, Agent, or Firm* — Rothwell, Figg, Ernst & Manbeck, P.C.

(57) ABSTRACT

A uniflow scavenging two-cycle engine includes an scavenging port having a swirling guide portion that guides scavenging gas into a cylinder in a direction inclined with respect to a radial direction of the cylinder, and a center guide portion that is provided to be closer to a crank side of the cylinder than the swirling guide portion and guides the scavenging gas further toward the center side of the cylinder than the swirling guide portion. At least a part of the center guide portion faces a piston when the piston is positioned at bottom dead center during the high compression ratio mode, and the center guide portion and the piston do not face each other or an area of facing the piston is smaller than that during the high compression ratio mode when the piston is positioned at bottom dead center during the low compression ratio mode.

2 Claims, 17 Drawing Sheets

(51) Int. Cl.
*F02B 75/04* (2006.01)
*F02B 23/10* (2006.01)
*F02D 15/02* (2006.01)
*F02B 31/00* (2006.01)
*F02D 19/10* (2006.01)

(52) U.S. Cl.
CPC ............ *F02B 75/04* (2013.01); *F02B 75/044* (2013.01); *F02D 15/02* (2013.01); *F02B 2023/108* (2013.01); *F02D 19/105* (2013.01); *Y02T 10/125* (2013.01); *Y02T 10/146* (2013.01); *Y02T 10/32* (2013.01); *Y02T 10/36* (2013.01)

(58) Field of Classification Search
CPC .. F02B 75/044; F02B 2023/108; F02D 15/02; F02D 19/105; Y02T 10/125; Y02T 10/146; Y02T 10/32; Y02T 10/36
USPC ......................................................... 123/304
See application file for complete search history.

(56) References Cited

U.S. PATENT DOCUMENTS

| | | | | |
|---|---|---|---|---|
| 3,905,340 | A | * | 9/1975 | Boyesen ................ F01L 3/205 123/73 A |
| 4,635,590 | A | * | 1/1987 | Gerace ................ F01B 3/0005 123/190.1 |
| 4,827,882 | A | * | 5/1989 | Paul ........................ F01L 1/44 123/292 |
| 2005/0056239 | A1 | * | 3/2005 | Hirano ................ F02B 75/044 123/48 B |
| 2006/0124084 | A1 | * | 6/2006 | Hofbauer ................ F02B 1/12 123/55.7 |
| 2008/0006230 | A1 | * | 1/2008 | Kadota ................ F02B 75/044 123/48 R |
| 2012/0096853 | A1 | * | 4/2012 | Taylor .................... F02B 25/04 60/601 |
| 2012/0174881 | A1 | * | 7/2012 | Taylor .................... F02B 25/04 123/68 |
| 2013/0312704 | A1 | * | 11/2013 | Taylor .................... F02B 23/101 123/44 C |
| 2015/0167537 | A1 | | 6/2015 | Masuda et al. |

FOREIGN PATENT DOCUMENTS

| | | | |
|---|---|---|---|
| EP | 2801713 A1 | * 11/2014 | ............. F02B 75/04 |
| EP | 2 949 901 A1 | 12/2015 | |
| JP | 2-26700 B2 | 6/1990 | |
| JP | 2003-65090 A | 3/2003 | |
| JP | 2005-54619 A | 3/2005 | |
| JP | 2006-183482 A | 7/2006 | |
| JP | 4395474 B2 | 1/2010 | |
| JP | 4657162 B2 | 3/2011 | |
| JP | 2013-7320 A | 1/2013 | |
| JP | 2013-40578 A | 2/2013 | |
| JP | 2014-20375 A | 2/2014 | |
| JP | 2014-47707 A | 3/2014 | |
| JP | 2014-145289 A | 8/2014 | |
| WO | 2014/115572 A1 | 7/2014 | |

* cited by examiner

UNIFLOW SCAVENGING TWO-CYCLE ENGINE

CROSS-REFERENCE TO RELATED APPLICATIONS

This application is a continuation application based on a PCT Patent Application No. PCT/JP2015/080235, filed Oct. 27, 2015, whose priority is claimed on Japanese Patent Application No. 2014-221345, filed on Oct. 30, 2014, and Japanese Patent Application No. 2014-224453, filed on Nov. 4, 2014. The contents of both the PCT Application and the Japanese Applications are incorporated herein by reference.

TECHNICAL FIELD

The present disclosure relates to a uniflow scavenging two-cycle engine in which a compression ratio is variable.

BACKGROUND ART

A uniflow scavenging two-cycle engine used as an engine in a ship is provided with an exhaust port on one end side and a scavenging port on the other end side of a cylinder. When active gas is suctioned from the scavenging port to a combustion chamber in an intake stroke, exhaust gas produced in combustion behavior is pushed and is exhausted from the exhaust port with the suctioned active gas.

For example, Patent Document 1 discloses a scavenging port inclined with respect to a radial direction of a cylinder. Since scavenging gas flowing into the cylinder from the scavenging port flows with swirl, the scavenging gas is easy to maintain a separation state from an exhaust gas layer in the cylinder, and scavenging efficiency is improved. In addition, Patent Document 2 discloses a configuration in which a scavenging port is a so-called skewed port. Here, the skewed port is a port having a portion on an exhaust port side that is inclined with respect to a radial direction of the cylinder and a portion on a side opposite to the exhaust port that is parallel to the radial direction of the cylinder. The scavenging port is the skewed port, and thereby leveling of a scavenging speed is achieved when the scavenging gas flow toward a combustion chamber.

CITATION LIST

Patent Document

[Patent Document 1] Japanese Patent No. 4395474
[Patent Document 2] Japanese Patent (Granted) Application No. H02-26700

SUMMARY

Incidentally, in a dual-fuel engine that uses a liquid fuel and fuel gas, a compression ratio is variable in some cases. In an engine in which the compression ratio is variable, when the scavenging port is the skewed port disclosed in Patent Document 2, blow-by of the fuel gas is reduced at a low compression ratio because the scavenging speed is leveled. On the other hand, since the liquid fuel is injected in a high compression ratio, the blow-by of the fuel gas does not occur and the scavenging speed does not need to be leveled. Therefore, in the high compression ratio, compared to a case where the scavenging port for producing the swirling flow which is disclosed in Patent Document 1 is used, the swirling flow is weak and the scavenging efficiency is likely to be lowered.

In consideration of such a problem, an object of the present disclosure is to provide a uniflow scavenging two-cycle engine that is capable of performing appropriate scavenging in response to a compression ratio.

A first aspect according to a uniflow scavenging two-cycle engine of the present disclosure relates to the uniflow scavenging two-cycle engine that includes an exhaust port formed on one end side of a cylinder in which a piston reciprocates and a scavenging port formed on the other end side of the cylinder, and that switches between at least two operation modes of a low compression ratio mode and a high compression ratio mode in which top dead center and bottom dead center of the piston is positioned to be closer to the exhaust port side than in the low compression ratio mode. The scavenging port has a swirling guide portion that guides scavenging gas from an outside to an inside of the cylinder in a direction inclined with respect to a radial direction of the cylinder, and a center guide portion that is provided to be closer to the other end side of the cylinder than the swirling guide portion and guides the scavenging gas further toward the center side of the cylinder than the swirling guide portion. At least a part of the center guide portion faces the piston in a case where the piston is positioned at bottom dead center during the high compression ratio mode, and the center guide portion and the piston does not face each other or an area of facing the piston is smaller than that during the high compression ratio mode in a case where the piston is positioned at bottom dead center during the low compression ratio mode.

According to the uniflow scavenging two-cycle engine of the present disclosure, it is possible to perform appropriate scavenging in response to a compression ratio.

DESCRIPTION OF EMBODIMENTS

Hereinafter, an embodiment according to the present disclosure will be described with reference to the accompanying figures. The dimensions, the materials, the specific numbers other than the dimensions and the materials, or the like are provided only as examples for easy understanding of the disclosure, and the disclosure is not limited thereto except for a case where a particular description is provided. Note that, in the present specification and the figures, an element having substantially the same function and configuration is assigned with the same reference sign and a repeated description thereof is omitted, and illustration of an element without a direct relationship with the present disclosure is omitted in the figures.

In the following embodiment, it is possible to execute by selecting one from a gas operation mode in which a fuel gas as a gaseous fuel is mainly combusted or a diesel operation mode in which fuel oil as the liquid fuel is combusted. The so-called dual-fuel type uniflow scavenging two-cycle engine is described. However, a type of engine is not limited to the dual fuel, and may be a uniflow scavenging two-cycle engine.

Figure 1:
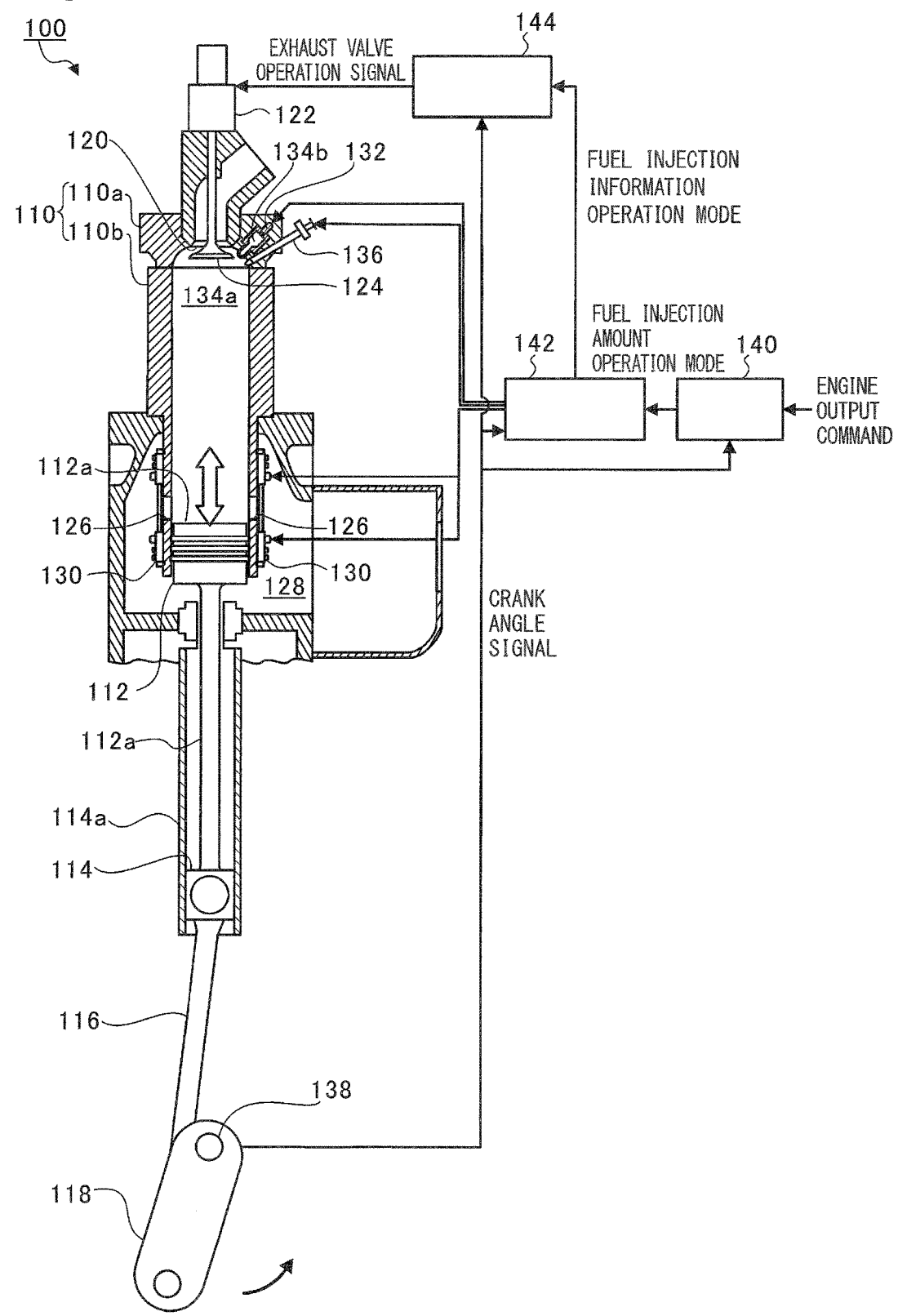
FIG. 1 is a view showing an entire configuration of a uniflow scavenging two-cycle engine.

FIG. 1 is a view showing an entire configuration of a uniflow scavenging two-cycle engine 100. The uniflow scavenging two-cycle engine 100 of the embodiment is used in a ship or the like. The uniflow scavenging two-cycle engine 100 is configured to include a cylinder 110, a piston 112, a crosshead 114, a connecting rod 116, a crankshaft 118, an exhaust port 120, an exhaust valve driving device 122, an exhaust valve 124, a scavenging port 126, a scavenging chamber 128, a first fuel supply unit 130, an auxiliary fuel supply unit 132, a main combustion chamber 134a, an auxiliary combustion chamber 134b, a second fuel supply unit 136, a rotary encoder 138, a governor 140 (speed regulator), a fuel supply control unit 142, and an exhaust control unit 144.

In the uniflow scavenging two-cycle engine 100, the piston 112 reciprocates in the cylinder 110 through four continuous strokes of intake (gas feeding), compression, combustion, and exhaust. One end of a piston rod 112a is fixed to the piston 112. The crosshead 114 is fixed to the other end of the piston rod 112a, and the crosshead 114 reciprocates along with the piston 112. A crosshead shoe 114a regulates movement of the crosshead 114 in a direction (rightward-leftward direction in FIG. 1) perpendicular to a stroke direction of the piston 112 (hereinafter, abbreviated to the stroke direction) in the cylinder 110.

One end of the connecting rod 116 is rotatably supported in the crosshead 114. In addition, the other end of the connecting rod 116 is connected to the crankshaft 118 and the crankshaft 118 is structured to rotate with respect to the connecting rod 116. As a result, when the crosshead 114 reciprocates in response to the reciprocating of the piston 112, the crankshaft 118 rotates by interlocking with the reciprocating of the crosshead 114.

In the uniflow scavenging two-cycle engine, since it is possible to form a relatively long stroke in the cylinder 110 and it is possible to cause the crosshead 114 to receive lateral pressure acting on the piston 112, it is possible to achieve a high output of the uniflow scavenging two-cycle engine 100.

The exhaust port 120 is provided in a cylinder head 110a positioned on an upper side from a position of top dead center of the piston 112 in FIG. 1. In other words, the exhaust port 120 is formed on the one end side (upper end side in FIG. 1) of the cylinder 110 in the stroke direction of the piston 112. The exhaust port 120 is opened and closed to discharge exhaust gas produced after combustion in the cylinder 110. The exhaust valve driving device 122 opens and closes the exhaust port 120 by causing the exhaust valve 124 to slide vertically at a predetermined timing. In this manner, the exhaust gas discharged via the exhaust port 120 is discharged to the outside, for example, after the exhaust gas is supplied to a turbine side of a supercharger (not shown).

The scavenging port 126 is a hole penetrating from an inner circumferential surface (inner circumferential surface of a cylinder block 110b) to an outer circumferential surface of the cylinder 110 on the other end side (lower end side in FIG. 1) in the stroke direction of the piston 112, and a plurality of scavenging ports are provided all around the cylinder 110. The scavenging ports 126 suction active gas in the cylinder 110 in response to a sliding motion of the piston 112. The active gas contains an oxidizing agent such as oxygen or ozone, or a mixture thereof (for example, air). The active gas (for example, air) pressurized by a compressor of the supercharger (not shown) is sealed in the scavenging chamber 128, and the active gas is suctioned from the scavenging port 126 due to differential pressure between the scavenging chamber 128 and the cylinder 110. The pressure in the scavenging chamber 128 can be substantially constant; however, a manometer may be provided in the scavenging port 126 in a case where the pressure in the scavenging chamber 128 changes, and other parameters such as an injection amount of the fuel gas according to a measurement value may be controlled.

The first fuel supply unit 130 is disposed on the outer circumferential side in the cylinder 110 from the scavenging port 126, and causes the active gas and a premixture (fuel gas) to be suctioned from the scavenging port 126 into the cylinder 110 in the gas operation mode. Hereinafter, the first fuel supply unit 130 will be described in detail with reference to FIGS. 2A and 2B.

Figure 2A:
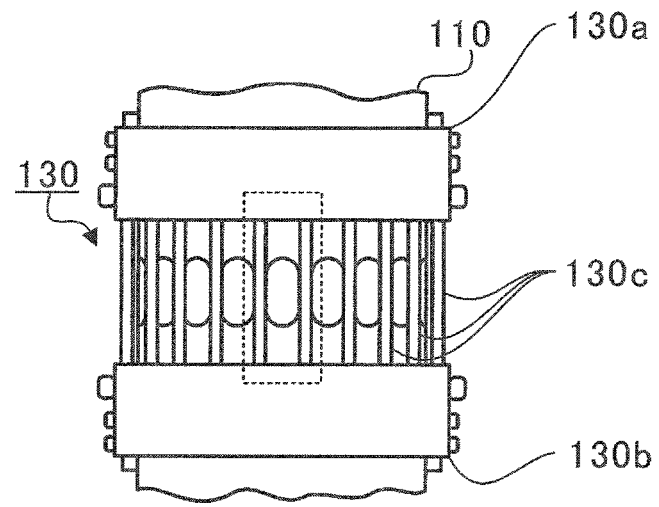
FIG. 2A is an enlarged view showing the vicinity of a first fuel supply unit on a side surface of a cylinder so as to describe the first fuel supply unit.
Figure 2B:
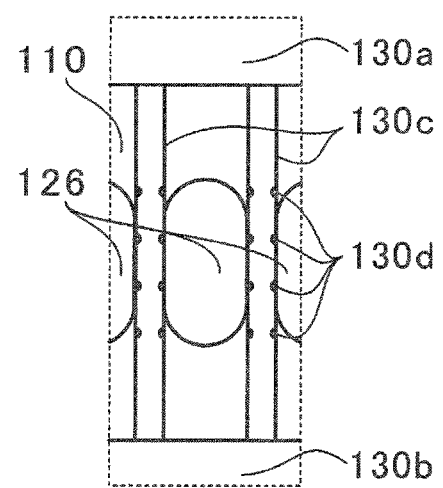
FIG. 2B is an enlarged view of a portion in a dashed line in FIG. 2A so as to describe the first fuel supply unit.

FIGS. 2A and 2B are views showing the first fuel supply unit 130, and FIG. 2A is an enlarged view showing the vicinity of the first fuel supply unit 130 of a side view of the cylinder 110. In addition, FIG. 2B is an enlarged view of a portion in a dashed line in FIG. 2A.

As shown in FIG. 2A, the first fuel supply unit 130 has mixture pipes 130a and 130b which are separately formed from the cylinder 110. The mixture pipes 130a and 130b are annular members surrounding the cylinder 110 from the outside in the radial direction along a circumferential direction. The mixture pipe 130a is disposed on the one end side (upper side in FIG. 2A) of the piston 112 from the scavenging port 126 in the stroke direction, and the mixture pipe 130b is disposed on the other end side (lower side in FIG. 2A) of the piston 112 from the scavenging port 126 in the stroke direction.

The mixture pipes 130a and 130b are provided with a mixture chamber that is formed in the inside thereof and extends to have an annular shape, and the fuel gas and the active gas are mixed in the mixture chamber such that the premixture is generated.

A plurality of circulation pipes 130c that extend in the stroke direction of the piston 112 are disposed between the mixture pipes 130a and 130b in the circumferential direction of the mixture pipes 130a and 130b. Of the adjacent circulation pipes 130c, one pipe communicates with the mixture pipe 130a, and the other pipe communicates with the mixture pipe 130b. The premixture from the mixture pipe 130a or the mixture pipe 130b is circulated in the circulation pipe 130c.

When the first fuel injecting valve (not shown) is opened, the premixture is ejected from an injection opening 130d formed on the side surface of the circulation pipe 130c shown in FIG. 2B. As a result, the premixture is sprayed from the injection opening 130d of the first fuel supply unit 130 toward the active gas flowing toward the scavenging port 126 from the scavenging chamber 128. Hereinafter, the premixture is simply referred to as the fuel gas except for a case where the premixture and the fuel gas are particularly distinguished.

Back to FIG. 1, the auxiliary fuel supply unit 132 is an injection valve provided in the cylinder head 110a. The uniflow scavenging two-cycle engine 100 includes the main combustion chamber 134a and the auxiliary combustion chamber 134b, as the combustion chamber. The main combustion chamber 134a is surrounded by the cylinder head 110a, a cylinder liner in a cylinder block 110b, and the piston 112. The auxiliary combustion chamber 134b is formed inside the cylinder head 110a and has one end that projects from the cylinder head 110a toward the main combustion chamber 134a side.

Figure 3A:
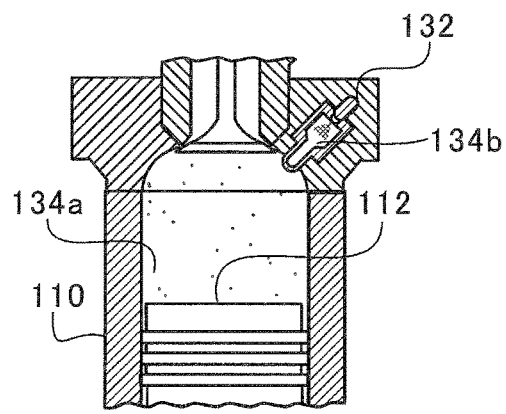
FIG. 3A is a view for showing an auxiliary fuel supply unit.
Figure 3B:
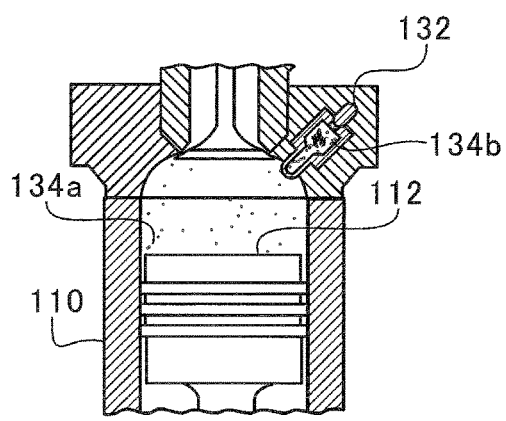
FIG. 3B is a view for showing the auxiliary fuel supply unit.
Figure 3C:
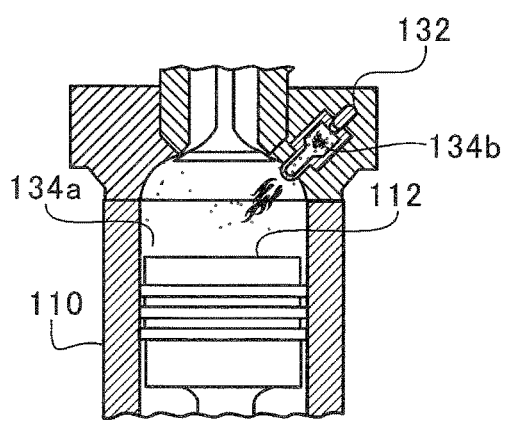
FIG. 3C is a view for showing the auxiliary fuel supply unit.

FIGS. 3A to 3C are views for showing the auxiliary fuel supply unit 132. In FIGS. 3A to 3C, the second fuel supply unit 136 is omitted for easy understanding. As shown in FIG. 3A, the auxiliary fuel supply unit 132 has the front end that is opened to the auxiliary combustion chamber 134b, and the fuel oil is ejected toward the auxiliary combustion chamber 134b in the gas operating mode.

The fuel oil ejected to the auxiliary combustion chamber 134b ignites with heat in the auxiliary combustion chamber 134b as shown in FIG. 3B. As shown in FIG. 3C, the fuel gas and the exhaust gas combusted in the auxiliary combustion chamber 134b is ejected along with flame to the main combustion chamber 134a, and the fuel gas suctioned into the cylinder 110 from the scavenging port 126 is combusted.

Back to FIG. 1, the second fuel supply unit 136 is an ejecting valve provided in the cylinder head 110a, has the front end that is opened to the main combustion chamber 134a, and the fuel oil is injected toward the main combustion chamber 134a in the diesel operation mode.

As described above, the fuel gas is supplied from the first fuel supply unit 130 into the cylinder 110 in the gas operation mode, and the fuel oil is supplied from the second fuel supply unit 136 into the cylinder 110 in the diesel operation mode. At this time, an appropriate compression ratio varies for the gas operation mode and the diesel operation mode. Specifically, the gas operation mode is performed at the low compression ratio, and the diesel operation mode is performed at the high compression ratio. In other words, the gas operation mode is equivalent to the low compression ratio mode, and the diesel operation mode is equivalent to the high compression ratio mode. In the embodiment, a variable compression ratio mechanism is provided in a connecting portion between the piston rod 112a and the crosshead 114 in order to make the compression ratio variable.

Figure 4A:
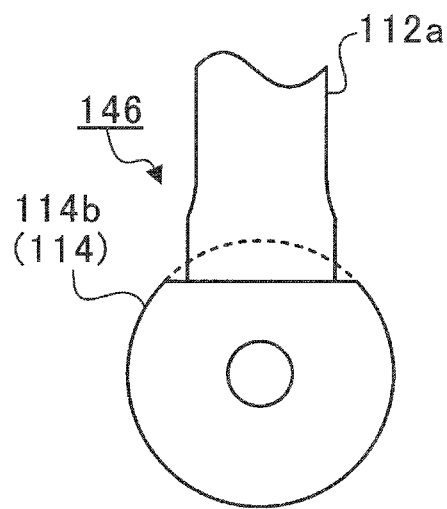
FIG. 4A is a view for showing a variable compression ratio mechanism.
Figure 4B:
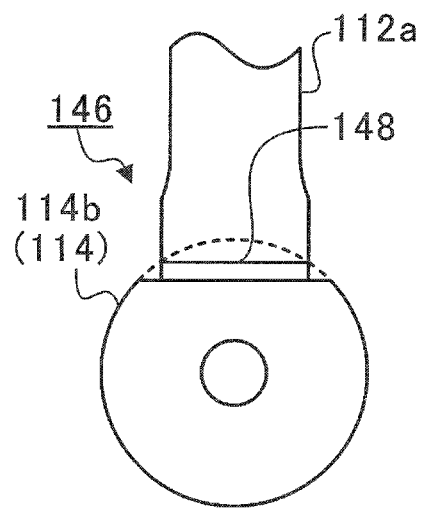
FIG. 4B is a view for showing the variable compression ratio mechanism.

FIGS. 4A and 4B are views showing the variable compression ratio mechanism 146, and show the connecting portion between the piston rod 112a and the crosshead 114. Since the gas operation mode is performed at the low compression ratio, as shown in FIG. 4A, the piston rod 112a and a crosshead pin 114b are directly connected to each other.

On the other hand, since the diesel operation mode is performed at the high compression ratio, as shown in FIG. 4B, a shim plate 148 is interposed between the piston rod 112a and the crosshead pin 114b, and the positions of the top dead center and the bottom dead center of the piston 112 are shifted to the exhaust port 120 side. In this manner, the variable compression ratio mechanism 146 is capable of reducing the volume of the main combustion chamber 134a at the top dead center so as to increase the compression ratio.

Back to FIG. 1, the rotary encoder 138 is provided in the crankshaft 118 and an angle signal of the crankshaft (hereinafter, referred to as a crank angle signal) is detected.

The governor 140 calculates a fuel injection amount, based on an engine output command value input from a higher control device and engine speed in response to a crank angle signal from the rotary encoder 138, and outputs the calculated amount to the fuel supply control unit 142.

The fuel supply control unit 142 controls the first fuel supply unit 130 and the second fuel supply unit 136, based on information representing a fuel injection amount input from the governor 140, information representing the operation mode, and the crank angle signal from the rotary encoder 138.

The exhaust control unit 144 outputs an exhaust valve operation signal to the exhaust valve driving device 122, based on information representing the fuel injection amount from the fuel supply control unit 142, information representing the operation mode, and the crank angle signal from the rotary encoder 138.

Figure 5A:
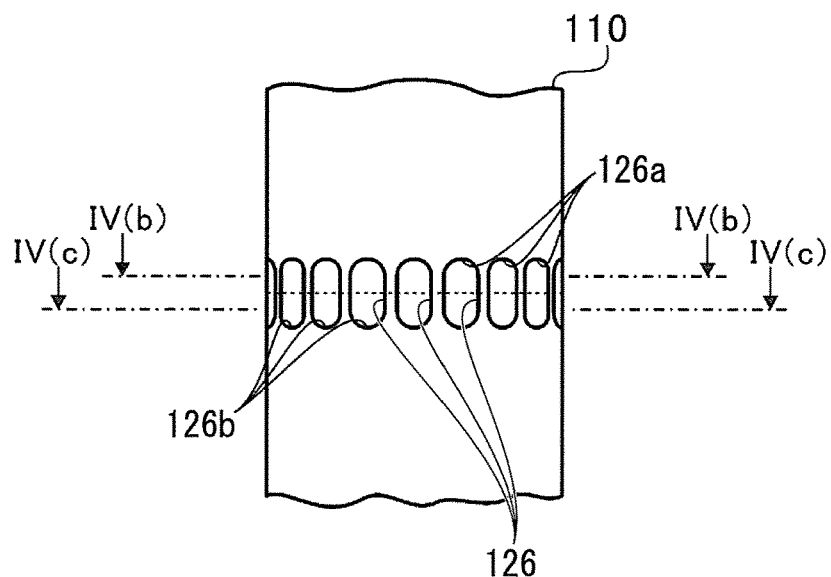
FIG. 5A is an enlarged view showing the vicinity of a scavenging port on the side surface of the cylinder so as to show the scavenging port.
Figure 5B:
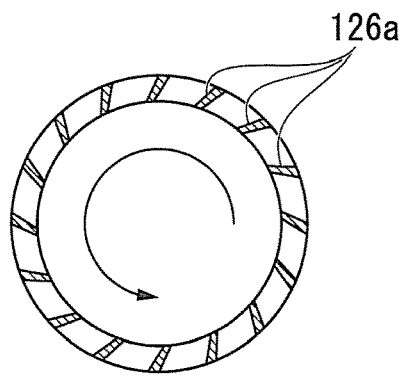
FIG. 5B is a sectional view taken along line IV(b)-IV(b) in FIG. 5A.
Figure 5C:
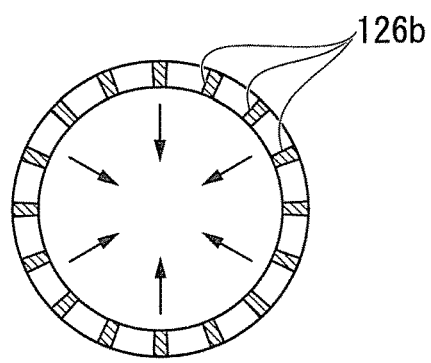
FIG. 5C is a sectional view taken along line IV(c)-IV(c) in FIG. 5A.

FIGS. 5A to 5C are views showing the scavenging port 126, FIG. 5A shows enlarged portion in the vicinity of the scavenging port 126 of a side view of the cylinder 110, FIG. 5B is a sectional view taken along line IV(b)-IV(b) in FIG. 5A, and FIG. 5C is a sectional view taken along line IV(c)-IV(c) in FIG. 5A.

The center of the piston 112 is represented by a dashed line in FIG. 5A. A swirling guide portion 126a is formed on one end side (upper side in FIG. 5A) of the scavenging port 126 in the stroke direction from the center of the stroke direction. In addition, a center guide portion 126b is formed on the other end side (lower side in FIG. 5A) in the stroke direction of the cylinder 110 from the swirling guide portion 126a.

As shown in FIG. 5B, the swirling guide portion 126a has a shape that guides the scavenging gas from an outside to an inside of the cylinder 110 in a direction inclined with respect to a radial direction of the cylinder 110. Specifically, the swirling guide portion 126a extends in a direction inclined with respect to the radial direction of the cylinder 110. In addition, any scavenging port 126 provided over the entire circumference of the cylinder 110 is also inclined substantially to the equal extent that the swirling guide portion 126a is inclined. As a result, as shown with an arrow in FIG. 5B, the scavenging gas forms swirling flow, and rises in the cylinder 110 so as to flow to the exhaust port 120 side.

As shown with an arrow in FIG. 5C, the center guide portion 126b has a shape that guides the scavenging gas toward the center side of the cylinder 110 from the swirling guide portion 126a. Specifically, the center guide portion 126b is an opening toward the center of the cylinder 110 and extends in the radial direction of the cylinder 110. As a result, as shown with an arrow in FIG. 5C, while the scavenging gas flows toward the center side of the cylinder 110 in the radial direction thereof, the scavenging gas rises in the cylinder 110 and flows to the exhaust port 120 side.

In this manner, the scavenging port 126 is a so-called skewed port. Operations performed and problems arising in the case where the scavenging port 126 is the skewed port are described with reference to FIGS. 6A and 6B.

Figure 6A:
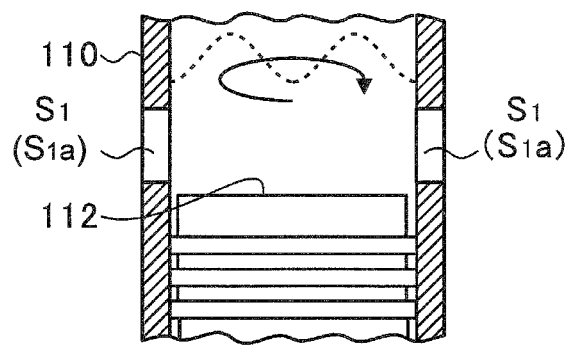
FIG. 6A is a view showing flow of scavenging gas in a first comparative example.
Figure 6B:
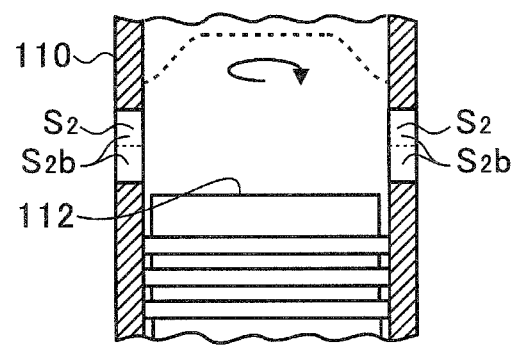
FIG. 6B is a view showing flow of scavenging gas in a second comparative example.

FIGS. 6A and 6B are views showing flow of scavenging gas in a comparative example. FIG. 6A shows flow of scavenging gas in a first comparative example, and FIG. 6B shows flow of scavenging gas in a second comparative example, in a state in which the piston 112 is positioned at the bottom dead center. In the first comparative example, a scavenging port S1 entirely becomes a swirling guide portion S1a, and, in the second comparative example, a scavenging port S2 becomes a skewed port.

As shown in FIG. 6A, in the first comparative example, since the scavenging port S1 entirely becomes the swirling guide portion S1a, a swirling flow (represented by an arrow in FIG. 6A) is strong in the flow of scavenging gas, the scavenging gas is likely to maintain a separation state from an exhaust gas layer in the cylinder 110, and thus scavenging efficiency is improved.

On the other hand, as understood when speed distribution of the scavenging gas to the exhaust port 120 side which is shown in a dashed line in FIG. 6A, the speed is likely to decrease in the central portion in the radial direction of the cylinder 110. At this time, since the fuel gas is mixed in the scavenging gas in the case of the gas operation mode (low compression ratio mode), there is a possibility that blow-by of the fuel gas which is not combusted from the exhaust port 120 is likely to be performed when uneven speed distribution of the scavenging gas is existed.

In contrast, when the scavenging port S2 is the skewed port as in the second comparative example, since the scavenging gas flows toward the center side of the cylinder 110 in the radial direction by a center guide portion S2b, a speed on the center side of the cylinder 110 in the radial direction increases toward the exhaust port 120. As a result, as shown with dashed line in FIG. 6B, the speed distribution of the scavenging gas toward the exhaust port 120 side is more leveled than in the first comparative example, and the blow-by of the fuel gas are reduced.

However, as shown with an arrow in FIG. 6B, when the scavenging port S2 is the skewed port, the swirling flow is likely to be weaker than in the first comparative example due to the extent that the center guide portion S2b is provided. For example, in the case of the diesel operation mode (high compression ratio mode), since the fuel gas is not injected from the first fuel supply unit 130 as in the gas operation mode, a priority is given to maintaining of the separation state between the scavenging gas and the exhaust gas without a concern of an occurrence of the blow-by of the fuel gas. However, since the swirling flow is weak in the second modification example, the scavenging efficiency is likely to be lowered.

Figure 7A:
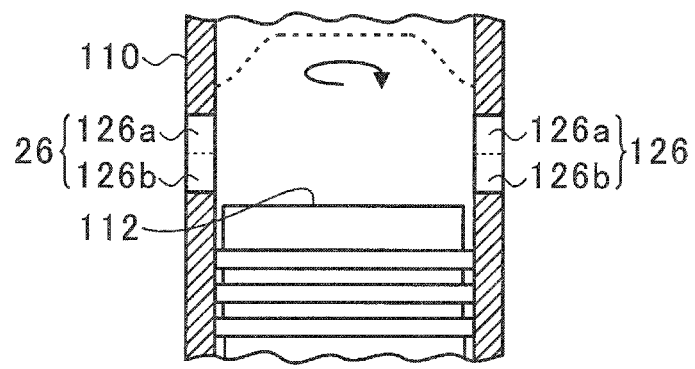
FIG. 7A is a view showing a state in which a piston is positioned at bottom dead center in a gas operation mode, so as to show flow of scavenging gas in the embodiment.
Figure 7B:
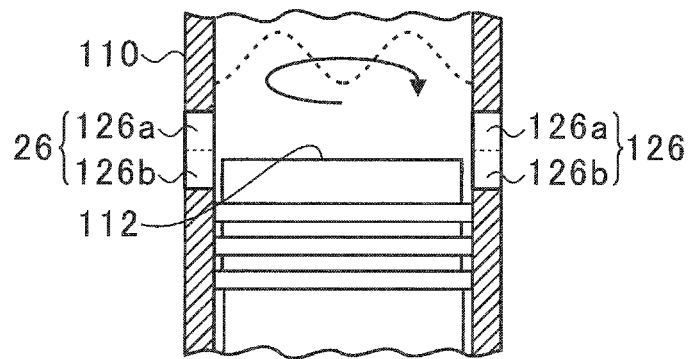
FIG. 7B is a view showing a state in which the piston is positioned at bottom dead center in a diesel operation mode, so as to show the flow of the scavenging gas in the embodiment.

FIGS. 7A and 7B are views showing the flow of scavenging gas in the embodiment. FIG. 7A shows a state in which the piston 112 is positioned at the bottom dead center in the gas operation mode, and FIG. 7B shows a state in which the piston 112 is positioned at the bottom dead center in the diesel operation mode.

As shown in FIG. 7A, in the gas operation mode (low compression ratio mode), similar to the second comparative example, the center guide portion 126b causes the scavenging gas to flow toward the center side of the cylinder 110 in the radial direction. Therefore, as shown with a dashed line in FIG. 7A, the speed distribution of the scavenging gas toward the exhaust port 120 side is more leveled than in the first comparative example, and the blow-by of the fuel gas are reduced.

On the other hand, as shown in FIG. 7B, in the diesel operation mode (high compression ratio mode), the position of the top dead center and the bottom dead center of the piston 112 are more shifted to the exhaust port 120 side than in the gas operation mode (low compression ratio mode). When the piston 112 is positioned at the bottom dead center in the diesel operation mode (high compression mode), the center guide portion 126b has a positional relationship of facing the piston 112 (side wall of the piston 112) in the radial direction of the piston 112 by this shift. Therefore, the scavenging gas does not almost flow in the cylinder 110 from the center guide portion 126b, and the majority of scavenging gas flows in the cylinder 110 from the swirling guide portion 126a. As a result, as shown with an arrow in FIG. 7B, the swirling flow becomes strong and the scavenging efficiency in improved.

As described above, actual opening conditions of the center guide portion 126b of the scavenging port 126 (skewed port) are adjusted by the position of the bottom dead center of the piston 112, and thereby it is possible to perform appropriate scavenging in response to the compression ratio.

In the embodiment described above, in the case where the piston 112 is positioned at the bottom dead center in the low compression ratio mode, a case where the center guide portion 126b and the piston 112 do not face each other is described. However, the center guide portion 126b may have a smaller area of facing the piston 112 in the low compression ratio mode than at least in the high compression ratio mode.

In addition, in the embodiment described above, the case where the swirling guide portion 126a and the center guide portion 126b form one scavenging port 126 is described. However, the swirling guide portion 126a and the center guide portion 126b may individually form ports, or two ports may have a part in which the two ports are connected.

In addition, in the embodiment described above, the case where the first fuel supply unit 130 ejects, from the injection opening 130d, the premixture obtained by mixing the fuel gas and the active gas, is described. However, instead of the premixture, the fuel gas may be injected from the injection opening 130d.

In addition, in the embodiment described above, the case where the first fuel supply unit 130 is disposed on the outer circumferential side in the cylinder 110 from the scavenging port 126, and causes the fuel gas to be suctioned from the scavenging port 126 into the cylinder 110 is described. However, the first fuel supply unit 130 may be disposed at any position as long as the first fuel supply unit supplies the fuel gas into the cylinder 110.

In addition, in the embodiment described above, the case where the variable compression ratio mechanism 146 has the configuration in which the positions of the top dead center and the bottom dead center of the piston 112 are variable depending on the presence and absence of the shim plate 148 is described. However, as long as there is provided a mechanism in which the compression ratio is variable, another configuration, such as a length of the piston 112 or the piston rod 112a may be hydraulically adjusted, may be employed. An example of the other configuration of the variable compression ratio mechanism will be described below in detail.

In addition, in the embodiment described above, the configuration, in which the main combustion chamber 134a and the auxiliary combustion chamber 134b are provided as the combustion chamber, and the fuel gas combusted in the auxiliary combustion chamber 134b is injected into the main combustion chamber 134a in the gas operation mode, is described. However, a small amount of fuel oil may be injected in the main combustion chamber 134a to ignite the fuel gas suctioned from the scavenging port 126 without providing the auxiliary combustion chamber 134b.

In addition, in the embodiment described above, the case where a small amount of the fuel oil is injected into the auxiliary combustion chamber 134b such that the fuel gas in the auxiliary combustion chamber 134b ignites is described. However, the fuel gas in the auxiliary combustion chamber 134b may ignite with a spark plug.

In addition, in the embodiment described above, the case where two modes of the low compression ratio mode and the high compression ratio mode are provided is described. however, three or more modes having different compression ratios may be provided, and at least two modes of the three or more modes may correspond to the low compression ratio mode and the high compression ratio mode.

Here, an example of the other configuration of the variable compression ratio mechanism which can be applied to the present disclosure is described below in detail.

In the related art, a configuration of a four-cycle engine including a piston that is provided with a cylindrical piston outer having the sealed top surface, and a piston inner that is provided to freely slide inside the piston outer and is connected to a connecting rod via a piston pin in which a variable compression ratio mechanism is provided between the piston outer and the piston inner is disclosed (for example, see Japanese Unexamined Patent Application, First Publication No. 2005-54619 and Japanese Patent No. 4657162).

The variable compression ratio mechanism of the related art which is disclosed in the documents described above is configured to include a first rotary cam plate that is provided on the top surface of the piston inner and is configured to have a first projecting portion and a first recessed portion, a second rotary cam plate that is provided on a surface of the piston outer which faces the first rotary cam plate, and is configured to have a second recessed portion and a second projecting portion which mesh with the first projecting portion and the first recessed portion, and an actuator that causes the first rotary cam plate to rotate. The actuator is configured to include a hydraulic mechanism that causes the first rotary cam plate to rotate in one rotating direction, and a return spring that biases the first rotary cam plate in the other rotating direction; and a plunger of the hydraulic mechanism and the return spring are embedded in the piston inner.

In the variable compression ratio mechanism of the related art, the hydraulic mechanism of the actuator causes the first rotary cam plate to rotate against a bias force of the return spring, thereby the first projecting portion and the second projecting portion come into contact with each other, a relative distance between the piston inner and the piston outer increases such that a high compression ratio is obtained. Furthermore, the first projecting portion and the first recessed portion are caused to mesh with the second recessed portion and the second projecting portion, and a relative distance between the piston inner and the piston outer decreases such that a low compression ratio is obtained.

As described above, in the variable compression ratio mechanism of the related art, since the actuator for causing the first rotary cam plate to rotate is embedded in the piston inner, a problem arises in that the piston has a complicated shape and thus manufacturing costs of the piston are likely to increase.

In addition, since the first rotary cam plate is biased by the return spring usually in other rotating directions, a shear force is applied to the first projecting portion, the first recessed portion, the second recessed portion, and the second projecting portion. Hence, a problem arises in that members which configure the variable compression ratio mechanism need to have high stiffness and costs of material increase.

In consideration of such problems, a variable compression ratio mechanism, in which a compression ratio varies in a simplified structure and at low costs, is proposed as follows.

In order to solve the problems described above, the variable compression ratio mechanism is provided in an engine in which a piston slides in a cylinder due to explosion pressure produced in a combustion chamber, and the compression ratio varies by changing a position of a stroke of the piston. The variable compression ratio mechanism includes a first member that is provided with a plurality of tooth portions, which face a tooth surface thereof on the combustion chamber side, and which are provided on a circular circumference with the center axis of the piston as the axis, and that integrally reciprocates with the piston in a stroke direction of the piston, a second member that is provided with a plurality of meshing portions aligned on the same circular circumference with the tooth portions of the first member, that freely moves between a meshing position at which the meshing portions mesh with the tooth portions and a non-meshing position which is on the combustion chamber side from the meshing position and at which a meshing relationship between the meshing portions and the tooth portions is released, that freely rotates around the center axis of the piston at the non-meshing position, and that has different depths of meshing between the tooth portions and the meshing portions depending on a relative rotating position with respect to the first member at the meshing position, a contact portion that is provided in the second member and faces the first member side, a contact target portion that is provided on the first member side from the contact portion, and is disposed to face the contact portion, and a driving unit that causes the contact portion and the contact target portion to approach each other in the stroke direction and causes both to come into contact with each other, and that causes the contact portion and the contact target portion to be separated from each other in the stroke direction after a pressing force is applied to the second member in the stroke direction via the contact portion. In addition, at least one of the contact portion and the contact target portion is configured of an inclined surface having an inclined angle in the rotating direction of the second member. When the contact portion and the contact target portion come into contact with each other by the driving unit in the state in which the second member is disposed at the meshing position, the pressing force generated by the driving unit is distributed along the inclined surface in the stroke direction and the rotating direction and is transmitted to the second member, the second member moves from the meshing position to the non-meshing position due to the pressing force in the stroke direction, the second member rotates due to a component force acting on the rotating direction such that the relative rotating position with respect to the first member changes, and then the second member moves to the meshing position when the contact portion and the contact target portion are separated from each other after the rotation of the second member.

As a result, it is possible to change the compression ratio in a simplified structure and at low costs.

In addition, the contact target portion may be provided with a plurality of tooth members facing the tooth surfaces on the combustion chamber side, on the circular circumference with the center axis of the piston as the axis, the contact portion may be provided with a plurality of meshing members disposed on the same circular circumference with the tooth members of the contact target portion, the meshing members may mesh with the tooth members, and the inclined surface may be provided on the tooth members and the meshing members.

In addition, the driving unit causes the contact target portion to move in a direction in which the contact target portion approaches the combustion chamber, thereby, causing the contact target portion to come into contact with the contact portion, and causes the contact target portion to move in a direction in which the contact target portion is separated from the combustion chamber, thereby, causing the contact target portion to be separated from the contact portion.

In addition, the contact portion is provided in the circumferential direction of the second member and the contact target portion is provided in the circumferential direction of the first member.

In addition, the meshing portion of the second member has an apex, a first bottom portion that is positioned on the one side in the rotating direction of the second member with the apex as the boundary, and a second bottom portion that is positioned on the other side in the rotating direction of the second member with the apex as the boundary and has a larger depth from the apex than the first bottom portion. The distance between the apexes of the meshing members of the contact portion and the distance between the apexes of the tooth members of the contact target portion are longer than the distance between the apex of the meshing portion of the second member and the second bottom portion adjacent in the apex in the rotating direction, and is shorter than the distance between the first bottom portion and the second bottom portion in the rotating direction.

In addition, the driving unit may cause the contact portion and the contact target portion to approach each other in the stroke direction such that both come into contact with each other, when the piston reaches the bottom dead center, and may cause the contact portion and the contact target portion to be separated from each other in the stroke direction after the pressing force is applied to the second member in the stroke direction via the contact portion.

In addition, the engine may include a piston rod having one end fixed to the piston, and a crosshead that is connected to the other end side of the piston rod and integrally reciprocates with the piston. The first member and the second member may be provided in any one of the piston, the piston rod, or the crosshead.

Hereinafter, an embodiment of the variable compression ratio mechanism described above will be described in detail with reference to the accompanying figures. The dimensions, materials, the specific numbers other than the dimensions and the materials, or the like is provided only as an example for easy understanding of the disclosure, and the disclosure is not limited thereto except for a case where a particular description is provided. Note that, in the following description, an element having substantially the same function and configuration is assigned with the same reference sign and a repeated description thereof is omitted, and illustration of an element without a direct relationship with the present disclosure is omitted in the figures.

In the following embodiment, first, the engine that is provided with the variable compression ratio mechanism will be described, and then the variable compression ratio mechanism will be described in detail. Note that, in the embodiment, as the engine that is provided with the variable compression ratio mechanism, a uniflow scavenging type of engine in which one period is constituted of two cycles (strokes) and gas flows in one direction inside the cylinder. However, as long as the engine provided with the variable compression ratio mechanism is an engine in which the piston slides in the cylinder due to the explosion pressure produced in the combustion chamber, the number of cycles and the flowing direction of gas are not limited thereto.

(Uniflow Scavenging Two-Cycle Engine 1100)

Figure 8:
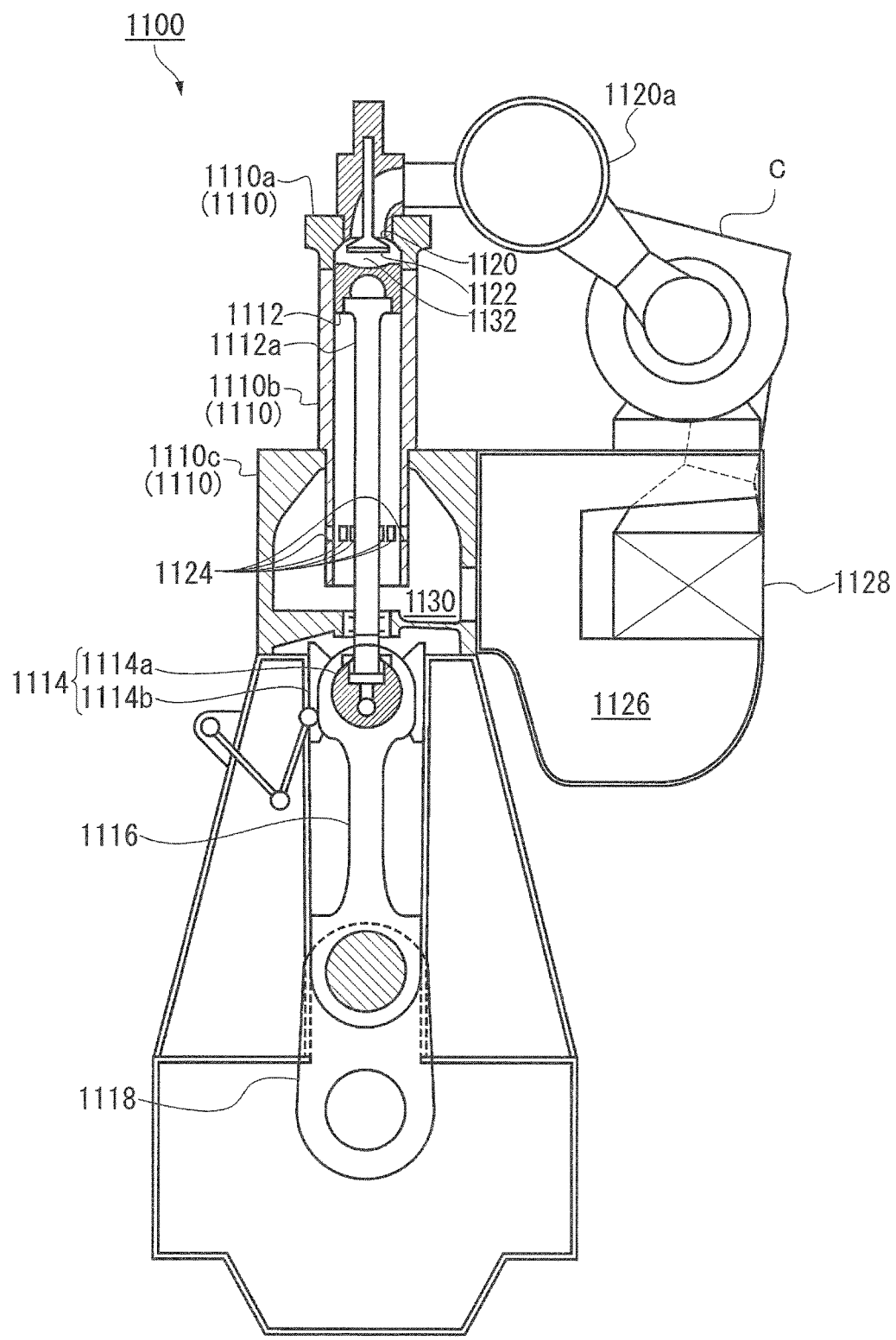
FIG. 8 is a view showing another entire configuration of the uniflow scavenging two-cycle engine.

FIG. 8 is a view showing an entire configuration of a uniflow scavenging two-cycle engine 1100. The uniflow scavenging two-cycle engine 1100 of the embodiment is used in a ship or the like.

In addition, the uniflow scavenging two-cycle engine 1100 of the embodiment is a so-called dual-fuel type engine, in which it is possible to execute by selecting one from the gas operation mode in which the fuel gas as the gaseous fuel is mainly combusted or the diesel operation mode in which fuel oil as the liquid fuel is combusted. Specifically, the uniflow scavenging two-cycle engine 1100 is configured to include a cylinder 1110, a piston 1112, a crosshead 1114, a connecting rod 1116, a crankshaft 1118, an exhaust port 1120, an exhaust valve 1122, a scavenging port 1124, a scavenging reservoir 1126, a cooler 1128, a scavenging chamber 1130, and a combustion chamber 1132.

In the uniflow scavenging two-cycle engine 1100, exhaust, intake, compression, and combustion are performed during two strokes of an ascending stroke and a descending stroke of the piston 1112 and the piston 1112 reciprocates in the cylinder 1110. One end of a piston rod 1112a is fixed to the piston 1112. In addition, a crosshead pin 1114a of the crosshead 1114 is fixed to the other end of the piston rod 1112a, and the crosshead 1114 reciprocates along with the piston 1112. A crosshead shoe 1114b regulates movement of the crosshead 1114 in a direction (rightward-leftward direction in FIG. 8) perpendicular to a stroke direction of the piston 1112.

The crosshead pin 1114a is inserted into a hole provided at one end of the connecting rod 1116, and supports the one end of the connecting rod 1116. In addition, the other end of the connecting rod 1116 is connected to the crankshaft 1118 and the crankshaft 1118 is structured to rotate with respect to the connecting rod 1116. As a result, when the crosshead 1114 reciprocates in response to the reciprocating of the piston 1112, the crankshaft 1118 rotates by interlocking with the reciprocating.

The exhaust port 1120 is an opening provided in a cylinder head 1110a positioned above the top dead center of the piston 1112, and is opened and closed to discharge exhaust gas produced after combustion in the cylinder 1110. The exhaust valve 1122 slides vertically at a predetermined timing by an exhaust valve driving device (not shown) and opens and closes the exhaust port 1120. In this manner, the exhaust gas discharged via the exhaust port 1120 is discharged to the outside, for example, after the exhaust gas is supplied to a turbine side of a supercharger C via an exhaust pipe 1120a.

The scavenging port 1124 is a hole penetrating from an inner circumferential surface (inner circumferential surface of a cylinder liner 1110b) to an outer circumferential surface of the cylinder 1110 on the lower end side, and a plurality of scavenging ports are provided all around the cylinder 1110. The scavenging ports 1124 suction active gas in the cylinder 1110 in response to a sliding motion of the piston 1112. The active gas contains an oxidizing agent such as oxygen or ozone, or a mixture thereof (for example, air).

The active gas (for example, air) pressurized by a compressor of the supercharger C is sealed in the scavenging reservoir 1126, and the active gas is cooled by the cooler 1128. The cooled active gas is pressed into the scavenging chamber 1130 formed in a cylinder jacket 1110c. The active gas is suctioned from the scavenging port 1124 into the cylinder 1110 due to differential pressure between the scavenging chamber 1130 and the cylinder 1110.

In addition, a pilot injection valve (not shown) is provided in the cylinder head 1110a. An appropriate amount of fuel oil is injected from the pilot injection valve at a predetermined time point in the engine cycle in the gas operation mode. The fuel oil is vaporized into fuel gas with heat in the combustion chamber 1132 surrounded by the cylinder head 1110a, the cylinder liner 1110b, and the piston 1112 and the fuel gas spontaneously ignites, is combusted in a short time, and the temperature of the combustion chamber 1132 rises to be very high. As a result, it is possible to reliably combust the fuel gas flowing in the cylinder 1110 at a predetermined timing. The piston 1112 reciprocates using expansion pressure mainly produced from the combustion of the fuel gas.

Here, the fuel gas is generated, for example, by gasifying liquefied natural gas (LNG). In addition, the fuel gas is not limited to the LNG, and, for example, gas generated by gasifying liquefied petroleum gas (LPG), gas oil, heavy oil, or the like can be applied to the fuel gas.

On the other hand, a larger amount of fuel oil is injected from the pilot injection valve in the diesel operation mode than an injection amount of the fuel oil in the gas operation mode. The piston 1112 reciprocates without using the fuel gas but using expansion pressure produced from the combustion of the fuel gas.

In addition, the uniflow scavenging two-cycle engine 1100 is provided with the variable compression ratio mechanism that changes the stroke positions of the piston 1112 and thereby changing the compression ratio. Hereinafter, the variable compression ratio mechanism will be described in detail.

(Variable Compression Ratio Mechanism 1200)

Figure 9:
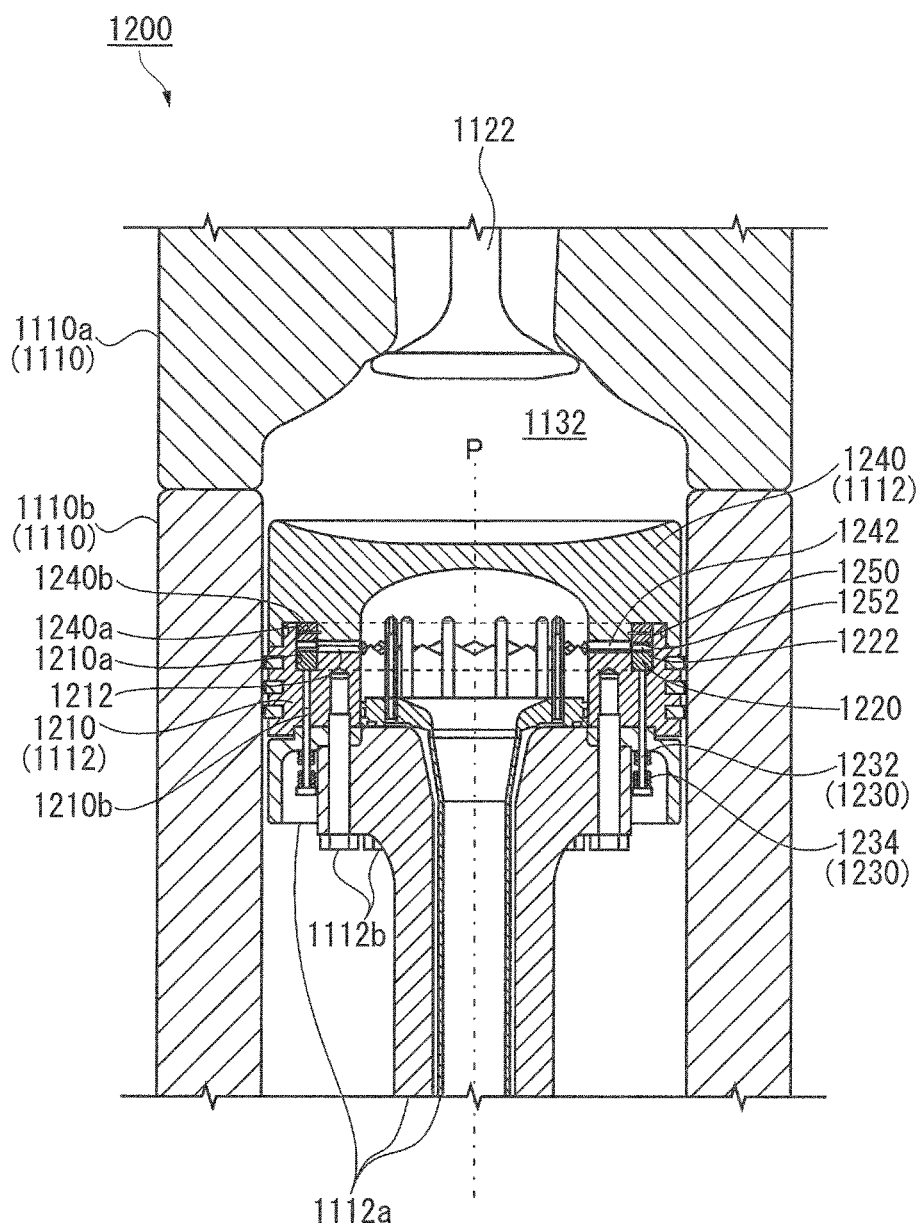
FIG. 9 is a view for describing a variable compression ratio mechanism.

FIG. 9 is a view showing a variable compression ratio mechanism 1200, and a sectional view showing the piston 1112 and the vicinity of the piston 1112. As shown in FIG. 9, the piston 1112 of the embodiment is configured to include a first member 1210 connected to the piston rod 1112a by using a bolt 1112b, and a second member 1240 disposed on the combustion chamber 1132 side from the first member 1210.

The variable compression ratio mechanism 1200 is configured to include the first member 1210, a press member 1220, the driving unit 1230, the second member 1240, and a press target member 1250.

The first member 1210 has a cylindrical shape and is provided with tooth portions 1212 on a surface on the combustion chamber 1132 side. In addition, the first member 1210 is provided with an annular groove 1210a formed outwardly in the radial direction from the tooth portions 1212, and the press member 1220 is positioned in the annular groove 1210a so as to freely move in the stroke direction. The press member 1220 is provided with a contact target portion 1222 on a surface on the combustion chamber 1132 side.

The driving unit 1230 is configured to include rods 1232 that communicate with the annular groove 1210a, are inserted into insertion holes 1210b formed at intervals in the circumferential direction of the annular groove 1210a, and are connected to a back surface of the contact target portion 1222 of the press member 1220, a spring 1234 that biases the rods 1232 to the second member 1240 side, and an actuator (for example, a hydraulic mechanism or a motor) not shown which presses the rods 1232 to the combustion chamber 1132 side. The driving unit causes the press member 1220 to move in the stroke direction. Note that a plurality of rods 1232 are connected to the press member 1220 and regulates the movement of the press member 1220 in the rotating direction.

The second member 1240 has a cylindrical shape and is provided with meshing portions 1242 on a surface facing the first member 1210. In addition, the second member 1240 is provided with an annular groove 1240a formed outwardly in the radial direction from the meshing portions 1242, and the press target member 1250 is fitted into the annular groove 1240a. The press target member 1250 is fixed to the second member 1240 with a pin 1240b. Hence, the press target member 1250 moves along with the second member 1240. The press target member 1250 is provided with a contact portion 1252 on a surface on the first member 1210 side.

Note that, in the embodiment, the first member 1210 and the contact target portion 1222 (press member 1220) move only in the stroke direction, and the second member 1240 and the contact portion 1252 (press target member 1250) move in the stroke direction, and moves around a center axis P of the piston 1112, which will be described below in detail.

Figure 10A:
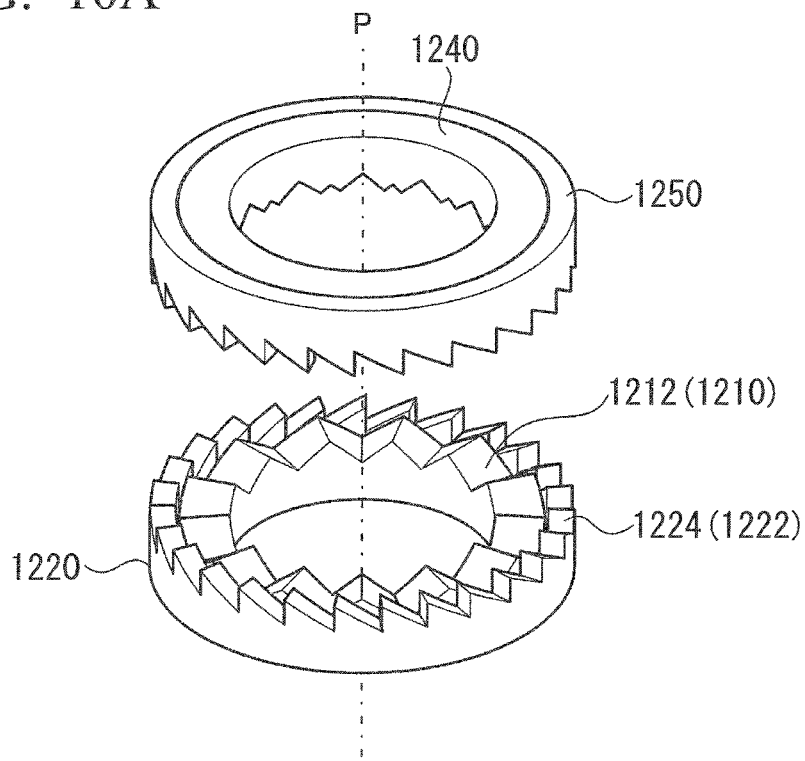
FIG. 10A is a perspective view showing the variable compression ratio mechanism.
Figure 10B:
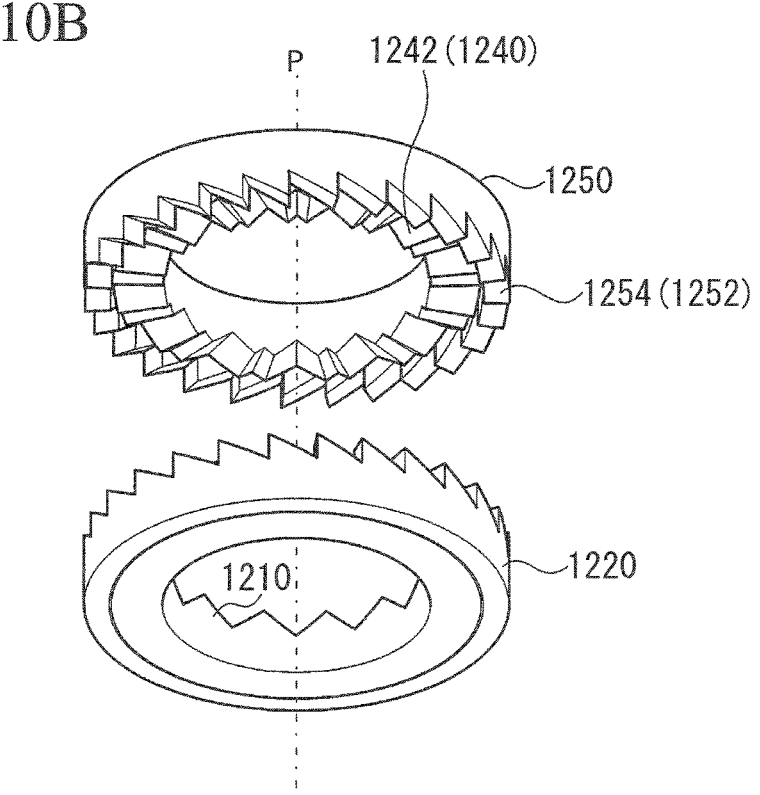
FIG. 10B is a perspective view showing the variable compression ratio mechanism.
Figure 11A:
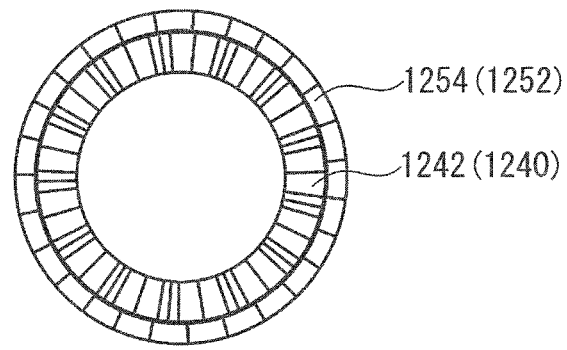
FIG. 11A is a plan view showing a second member and a contact portion of a portion surrounded in a dashed line in FIG. 9 so as to show the variable compression ratio mechanism.
Figure 11B:
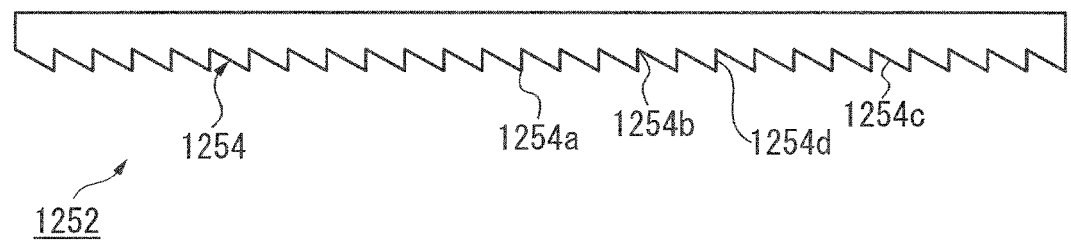
FIG. 11B is a view showing the unrolled contact portion in a circumferential direction so as to show the variable compression ratio mechanism.
Figure 11C:
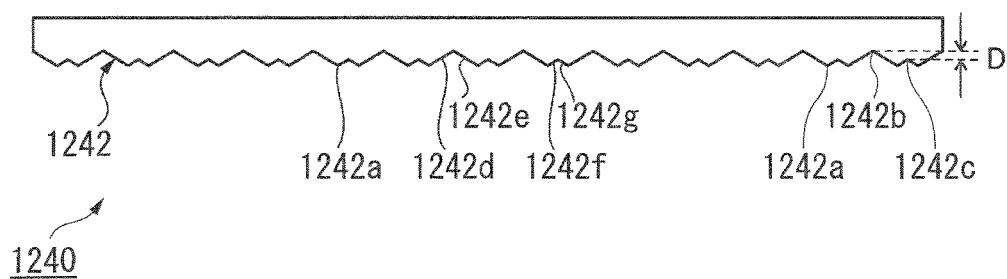
FIG. 11C is a view showing the unrolled second member in the circumferential direction so as to show the variable compression ratio mechanism.
Figure 11D:
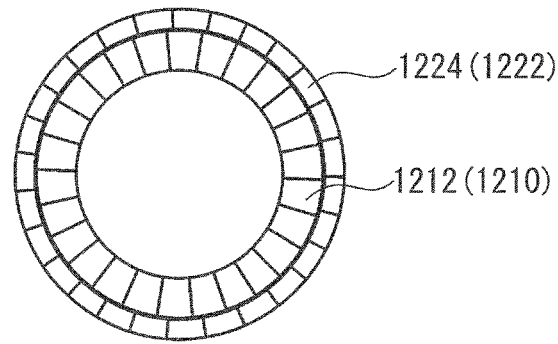
FIG. 11D is a plan view showing a first member and a contact target portion in the portion surrounded in the dashed line in FIG. 9 so as to show the variable compression ratio mechanism.
Figure 11E:
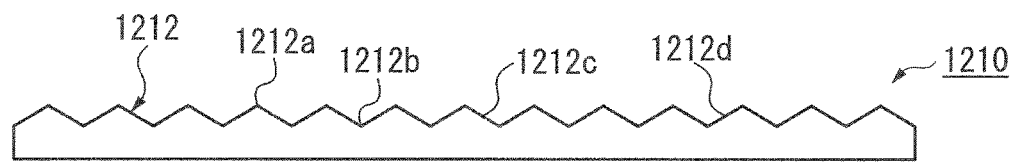
FIG. 11E is a view showing the unrolled first member in the circumferential direction so as to show the variable compression ratio mechanism.
Figure 11F:
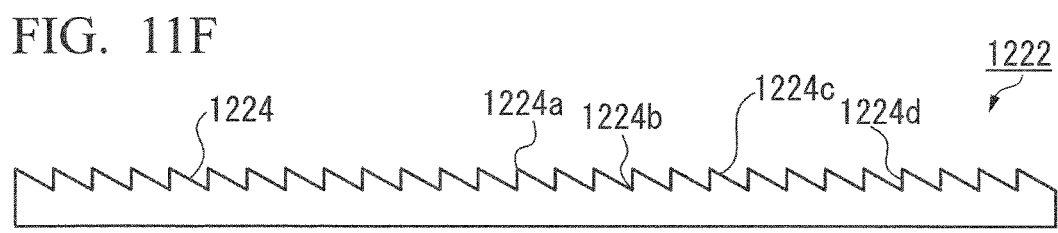
FIG. 11F is a view showing the unrolled contact target portion in the circumferential direction so as to show the variable compression ratio mechanism.

FIGS. 10A, 10B, and 11A to 11F are views showing the first member 1210, the press member 1220, the second member 1240, and the press target member 1250. FIGS. 10A and 10B are perspective views showing a portion surrounded in a dashed line in FIG. 9. FIG. 11A is a plan view showing the second member 1240 and the contact portion 1252 of the portion surrounded in the dashed line in FIG. 9. FIG. 11B is a view showing the unrolled contact portion 1252 in a circumferential direction. FIG. 11C is a view showing the unrolled second member 1240 in the circumferential direction. FIG. 11D is a plan view showing the first member 1210 and the contact target portion 1222 in the portion surrounded in the dashed line in FIG. 9. FIG. 11E is a view showing the unrolled first member 1210 in the circumferential direction. FIG. 11F is a view showing the unrolled contact target portion 1222 in the circumferential direction.

As shown in FIG. 10A, the first member 1210 is provided with a plurality of tooth portions 1212 having a tooth surface on the combustion chamber 1132 (refer to FIG. 9) on the circular circumference with the center axis P of the piston 1112 (refer to FIG. 9) as the axis and reciprocates in the stroke direction.

In addition, as shown in FIGS. 11D and 11E, the tooth portion 1212 of the first member 1210 has an apex 1212a and a bottom portion 1212b which are disposed at equal intervals from each other in the rotating direction. In addition, the tooth portion 1212 of the first member 1210 is provided with an inclined surface 1212c that has an inclined angle in the circumferential direction (rotating direction of the second member 1240, hereinafter, simply referred to as a "rotating direction") with the center axis P as the axis, from the apex 1212a to the bottom portion 1212b, and an inclined surface 1212d that has an inclined angle from the bottom portion 1212b to the apex 1212a in the rotating direction. Note that the heights of the tooth portions 1212 of the first member 1210 are all the same.

As shown in FIG. 10B, the second member 1240 has a plurality of meshing portions 1242 aligned in the same circular circumference with the tooth portions 1212 of the first member 1210. In addition, as shown in FIGS. 11A and 11C, the meshing portion 1242 has an apex 1242a, and bottom portions 1242b and 1242c which have different depths from the apex 1242a in the stroke direction. Specifically, the depth from the apex 1242a to the bottom portion 1242b (second bottom portion) in the rotating direction is larger by a width D than a depth from the apex 1242a to the bottom portion 1242c (first bottom portion).

In addition, the meshing portions 1242 of the second member 1240 are aligned such that the bottom portion 1242b and the bottom portion 1242c are alternately disposed to interpose the apex 1242a therebetween. In addition, the meshing portion 1242 of the second member 1240 is provided with an inclined surface 1242d that has an inclined angle in the rotating direction from the apex 1242a to the bottom portion 1242b, an inclined surface 1242e that has an inclined angle in the rotating direction from the bottom portion 1242b to the apex 1242a, an inclined surface 1242f that has an inclined angle in the rotating direction from the apex 1242a to the bottom portion 1242c, and an inclined surface 1242g that has an inclined angle in the rotating direction from the bottom portion 1242c to the apex 1242a.

In addition, the second member 1240 freely moves between a meshing position at which the meshing portions 1242 and the tooth portions 1212 mesh each other and a non-meshing position which is on the combustion chamber 1132 side from the meshing position and at which a meshing relationship between the meshing portions 1242 and the tooth portions 1212 is released, and freely rotates around the center axis P of the piston 1112 at the non-meshing position, which will be described below in detail. At the meshing position, the apexes 1212a of the tooth portions 1212 mesh with the bottom portions 1242b of the meshing portions 1242, or the apexes 1212a of the tooth portions 1212 mesh with the bottom portions 1242c of the meshing portions 1242, depending on the relative rotating position with respect to the first member 1210.

In other words, depths of meshing between the tooth portions 1212 and the meshing portions 1242 are different depending on a relative rotating position of the second member 1240 and the first member 1210.

As shown in FIG. 10A, the contact target portion 1222 is configured to have the plurality of tooth members 1224 provided in the circumferential direction of the first member 1210 and the tooth member 1224 has a tooth surface on the combustion chamber 1132 (refer to FIG. 9) side. The contact target portion 1222 is provided in the press member 1220 so as to freely move with respect to the first member 1210, and moves in the stroke direction in response to the press member 1220 by the driving unit 1230.

In addition, as shown in FIGS. 11D and 11F, the tooth members 1224 of the contact target portion 1222 are disposed such that the apexes 1224a are disposed at equal intervals in the rotating direction, that is, the bottom portions 1224b are disposed at equal intervals in the rotating direction. In addition, the tooth member 1224 of the contact target portion 1222 is provided with an inclined surface 1224c that has an inclined angle in the rotating direction from the apex 1224a to the bottom portion 1224b and a perpendicular surface 1224d that stands upright from the bottom portion 1224b to the apex 1224a.

As shown in FIG. 10B, the contact portion 1252 is configured to have the plurality of meshing members 1254 provided in the second member 1240 in the circumferential direction of the second member 1240 and are aligned on the same circular circumference with the tooth members 1224 of the contact target portion 1222, and the meshing members 1254 mesh with the tooth members 1224. As described above, in the embodiment, the contact portion 1252 is provided on the press target member 1250, and the press target member 1250 is fixed to the second member 1240 with the pin 1240b. Therefore, the contact portion 1252 integrally rotates with the second member 1240 or integrally reciprocates with the second member 1240 in the stroke direction.

In addition, as shown in FIGS. 11A and 11B, the meshing members 1254 of the contact portion 1252 are disposed such that the apexes 1254*a* are disposed at equal intervals in the rotating direction, that is, the bottom portions 1254*b* are disposed at equal intervals in the rotating direction. In addition, the meshing member 1254 of the contact portion 1252 is provided with an inclined surface 1254*c* that has an inclined angle in the rotating direction from the apex 1254*a* to the bottom portion 1254*b* and a perpendicular surface 1254*d* that stands upright from the bottom portion 1254*b* to the apex 1254*a*.

Subsequently, a dimensional relationship between the tooth portion 1212 of the first member 1210, the tooth member 1224 of the contact target portion 1222, the meshing portion 1242 of the second member 1240, and the meshing member 1254 of the contact portion 1252 will be described.

Figure 12:
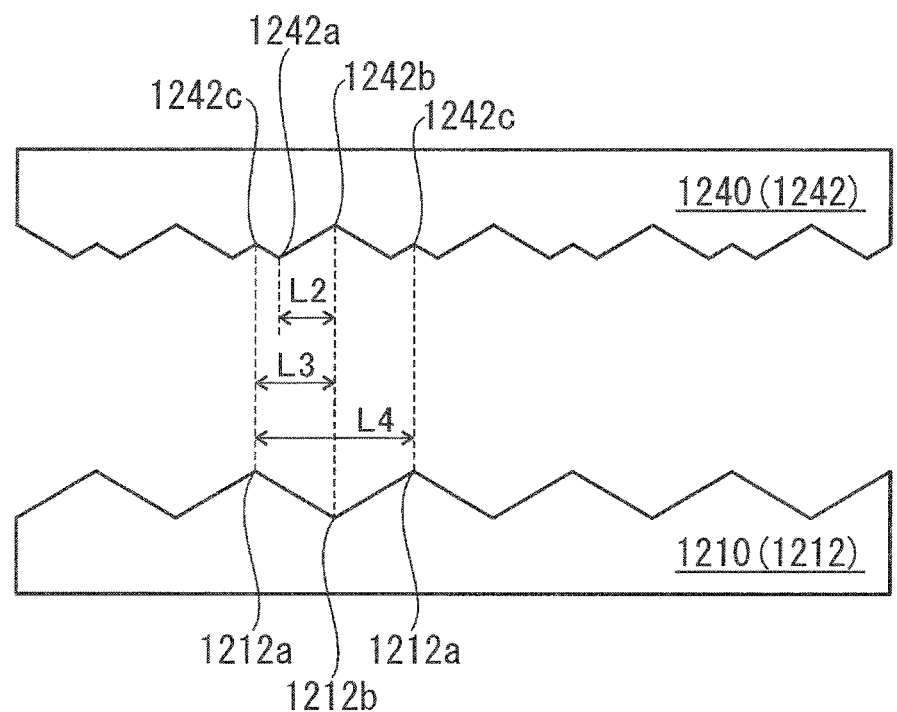
FIG. 12 is a view showing a dimensional relationship between a tooth portion of the first member, a tooth member of the contact target portion, a meshing portion of the second member, and a meshing member of the contact portion.
Figure 12:
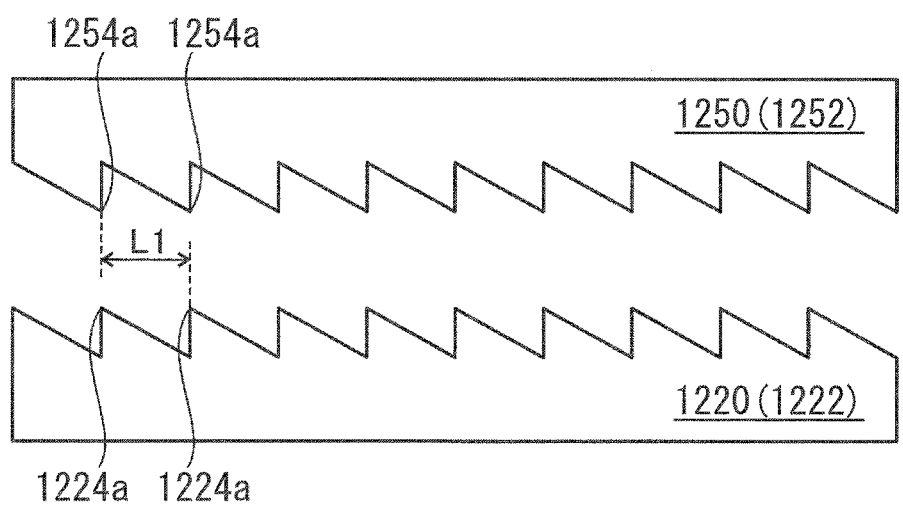

FIG. 12 is a view showing the dimensional relationship between the tooth portion 1212 of the first member 1210, the tooth member 1224 of the contact target portion 1222, the meshing portion 1242 of the second member 1240, and the meshing member 1254 of the contact portion 1252. As shown in FIG. 12, a distance (rotating angle) between the apexes 1254*a* of the contact portion 1252 in the rotating direction, that is, a distance (rotating angle) between the apexes 1224*a* of the contact target portion 1222 in the rotating direction, is referred to as a distance L1, the distance (rotating angle) between the apexes 1242*a* of the second member 1240 and the bottom portion 1242*b* adjacent to the apex 1242*a* in the rotating direction is referred to as a distance L2, a distance (rotating angle) between the bottom portion 1242*b* and the bottom portion 1242*c* of the second member 1240 in the rotating direction is referred to as a distance L3, and a distance (rotating angle) between bottom portions 1242*b* in the rotating direction and a distance (rotating angle) between the bottom portions 1242*c* in the rotating direction is referred to as a distance L4.

In this case, the contact target portion 1222, the second member 1240 and the contact portion 1252 are disposed such that the distance L1 is longer than the distance L2, and is shorter than the distance L3. In addition, the first member 1210 is disposed such that the distance between the apexes 1212*a* becomes the distance L4.

Subsequently, a change in compression ratio by the variable compression ratio mechanism 1200 is described. FIGS. 13A to 13C and 14A and 14B are views showing changes in compression ratio by the variable compression ratio mechanism 1200. Note that, for easy understanding, the first member 1210, the contact target portion 1222, the second member 1240, and the contact portion 1252 are shown in a simplified manner, and the driving unit 1230 is omitted in FIGS. 13A to 13C and 14A and 14B. In addition, the first member 1210 and the second member 1240 are represented by hatched regions, the contact target portion 1222 is represented by a black region, and the contact portion 1252 is represented by a white region. In addition, movement in the stroke direction is represented by a white arrow, and the movement in the rotating direction is represented by a black arrow in FIGS. 13A to 13C, 14A, and 14B.

Figure 13A:
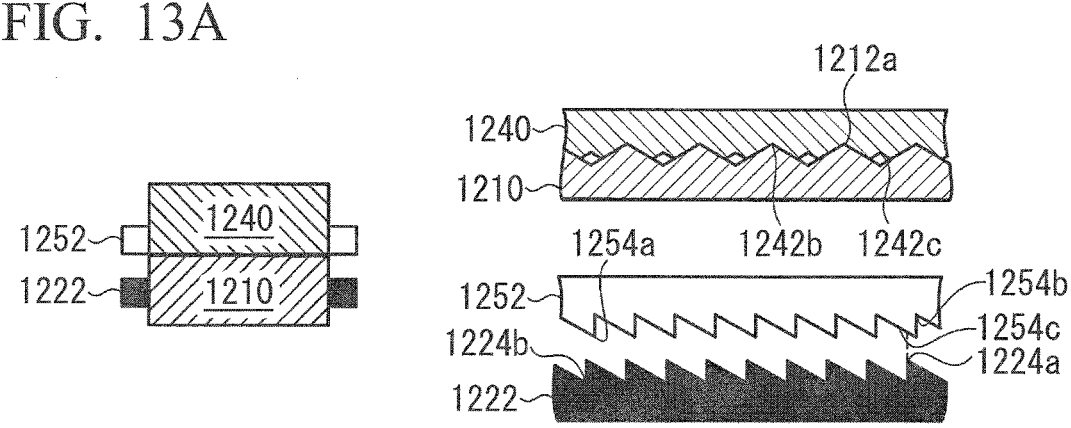
FIG. 13A is a first view showing a change in compression ratio by the variable compression ratio mechanism.

At the meshing position in which the tooth portions 1212 of the first member 1210 mesh with the meshing portions 1242 of the second member 1240, the contact portion 1252 and the contact target portion 1222 are separated in the stroke direction as shown in FIG. 13A. Note that, at a meshing position shown in FIG. 13A, the apexes 1212*a* of the first members 1210 mesh with the bottom portions 1242*b* of the second member 1240. In addition, at the meshing position, the apexes 1254*a* of the contact portion 1252 and the bottom portions 1224*b* of the contact target portion 1222 are disposed at different positions from each other in the circumferential direction. In other words, the apexes 1224*a* of the contact target portion 1222 have a positional relationship of facing the inclined surface 1254*c* of the contact portion 1252.

Figure 13B:
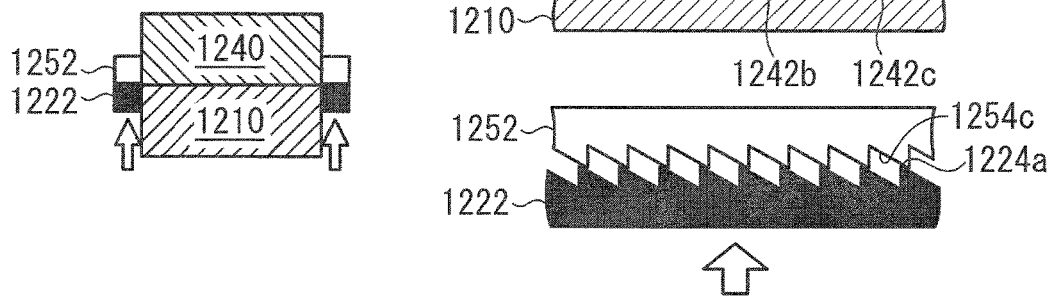
FIG. 13B is a first view showing a change in compression ratio by the variable compression ratio mechanism.

In a case where the compression ratio changes, the driving unit 1230 causes the contact target portion 1222 (press member 1220) to move in the stroke direction toward the contact portion 1252 (press target member 1250) side (direction of approaching to the combustion chamber 1132), and causes the contact target portion 1222 to come into contact with the contact portion 1252 as shown in FIG. 13B, and the pressing force is applied to the second member 1240 via the contact portion 1252. As described above, since the apex 1224*a* of the contact target portion 1222 has a positional relationship to face the inclined surface 1254*c* of the contact portion 1252, the press force generated by the driving unit 1230 is distributed on the inclined surface 1254*c* in the stroke direction and the rotating direction and is transported to the second member 1240.

Figure 13C:
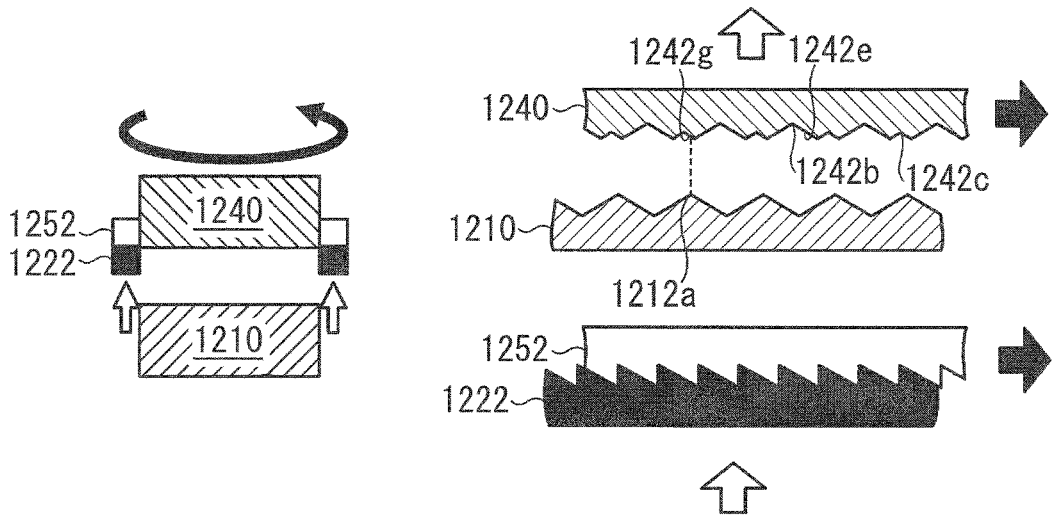
FIG. 13C is a first view showing a change in compression ratio by the variable compression ratio mechanism.

In this manner, as shown in FIG. 13C, the contact portion 1252 and the second member 1240 rotate, and the second member 1240 moves from the meshing position to the non-meshing position due to the press force in the stroke direction. When the apexes 1224*a* of the contact target portion 1222 mesh with the bottom portions 1254*b* of the press target member 1250, the relative rotating position (position in the circumferential direction) of the second member 1240 with respect to the first member 1210 is changed, and a positional relationship, in which the apexes 1212*a* of the first member 1210 and the inclined surfaces 1242*e* or the inclined surfaces 1242*g* (here, the inclined surfaces 1242*g*) of the second member 1240 face each other, is achieved.

In other words, the apexes 1212*a* of the first member 1210 mesh with the bottom portions 1242*b* of the second member 1240 at the meshing position shown in FIG. 13A, and the positional relationship in which the apexes 1212*a* of the first member 1210 and the inclined surface 1242*e* or the inclined surface 1242*g* (here, the inclined surfaces 1242*g*) of the second member 1240 face each other, is achieved at the non-meshing position shown in FIG. 13C.

Figure 14A:
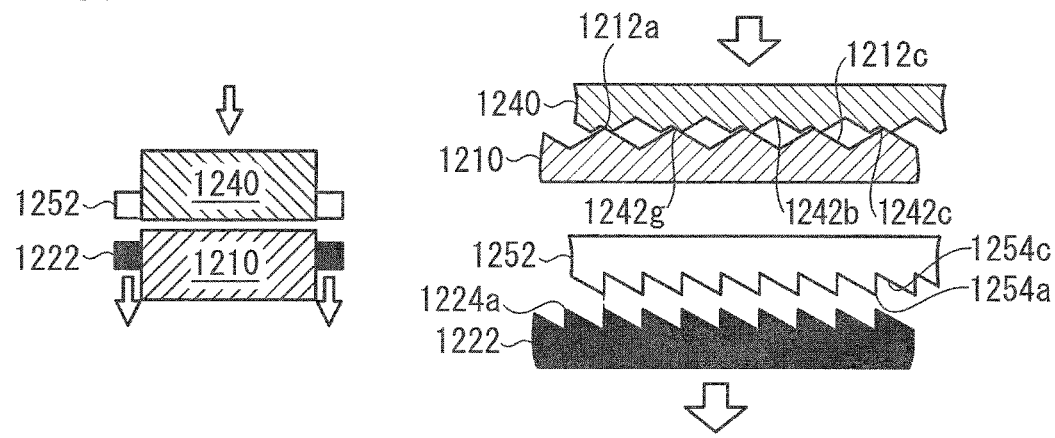
FIG. 14A is a second view showing a change in compression ratio by the variable compression ratio mechanism.

Subsequently, as shown in FIG. 14A, the driving unit 1230 causes the contact target portion 1222 (press member 1220) to move in a direction in which the contact target portion is separated from the combustion chamber 1132 such that the contact portion 1252 and the contact target portion 1222 are separated in the stroke direction. In the uniflow scavenging two-cycle engine 1100, since a force from the combustion chamber 1132 to the crankshaft 1118 is applied to the second member 1240 at all times, the contact target portion 1222 is caused to move in the direction in which the contact target portion 1222 is separated from the combustion chamber 1132, and thereby the second member 1240 and the contact portion 1252 move on the first member 1210 side.

Figure 14B:
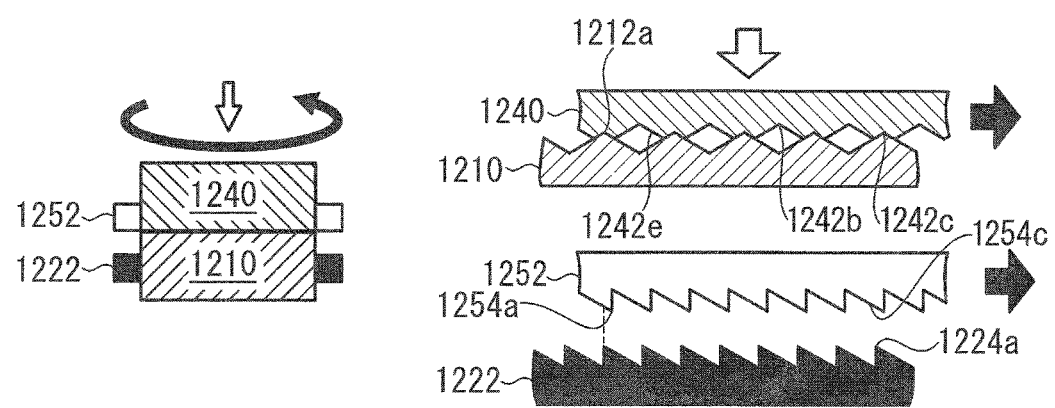
FIG. 14B is a first view showing a change in compression ratio by the variable compression ratio mechanism.

Here, as described above, since a positional relationship in which the apexes 1212*a* of the first member 1210 face the inclined surface 1242*g* of the meshing portion 1242 of the second member 1240 is achieved, the force from the combustion chamber 1132 to the crankshaft 1118 is applied to the inclined surface 1212*c* of the first member 1210 and the inclined surface 1242*e* of the second member 1240 in the rotating direction when the second member 1240 comes into contact with the first member 1210. In this manner, as shown in FIG. 14B, the second member 1240 further rotate in a process of meshing with the first member 1210, and moves to the meshing position at which the apexes 1212a of the first member 1210 mesh with the bottom portions 1242c of the second member 1240. In addition, the contact portion 1252 rotates in response to the rotation of the second member 1240, and thereby the positional relationship, that is, practically the same positional relationship as shown in FIG. 13A, in which the apexes 1224a of the tooth members 1224 of the contact target portion 1222 face the inclined surface 1254c of the meshing members 1254 of the contact portion 1252 is again achieved.

Figure 15A:
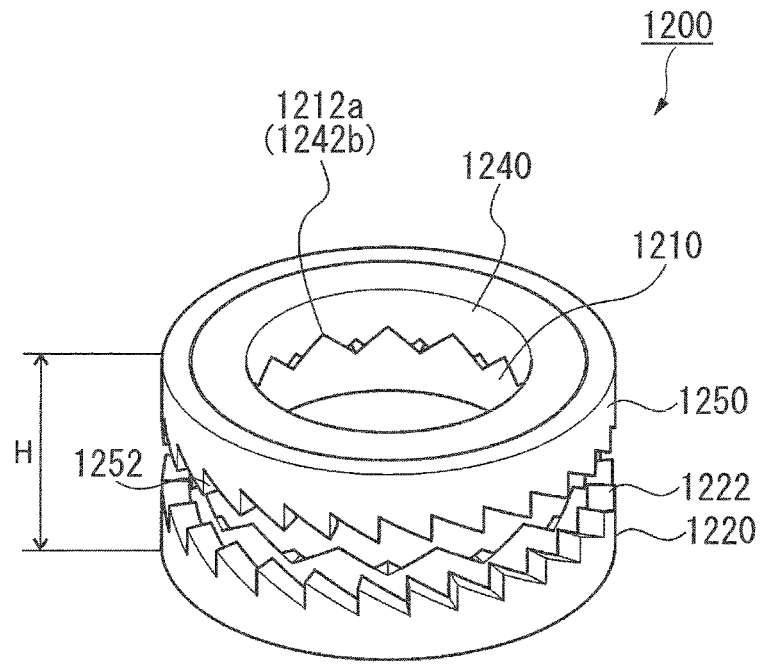
FIG. 15A is a view showing a positional relationship between the first member and the second member which have different meshing positions, respectively.
Figure 15B:
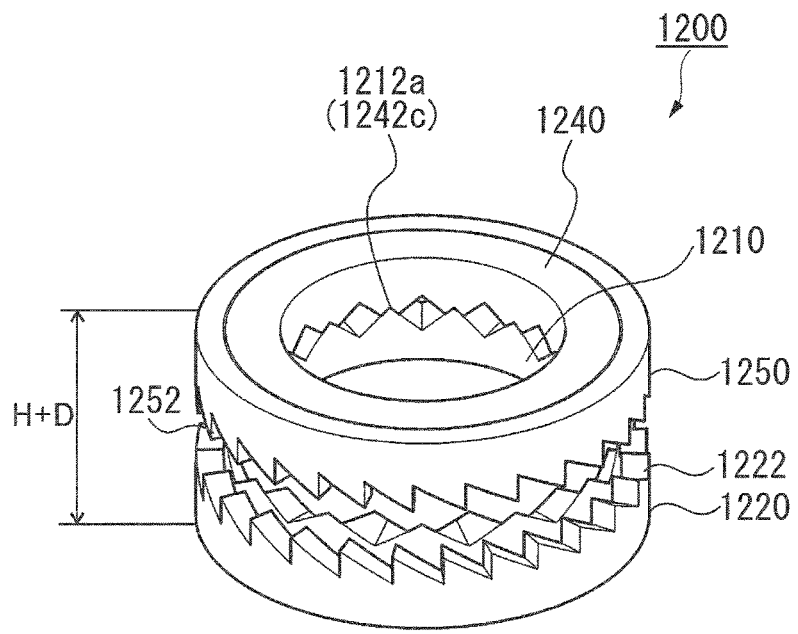
FIG. 15B is a view showing another positional relationship between the first member and the second member which have different meshing positions, respectively.

FIGS. 15A and 15B are views showing a positional relationship between the first member 1210 and the second member 1240 which have different meshing positions, respectively. FIG. 15A is a perspective view of the first member 1210 and the second member 1240 at the meshing position shown in FIG. 13A, and FIG. 15B is a perspective view of the first member 1210 and the second member 1240 at the meshing position shown in FIG. 14B.

As described above, the driving unit 1230 causes the contact target portion 1222 (press member 1220) to move in an approach direction to the combustion chamber 1132 and to come into contact with the contact portion 1252, and the pressing force is applied to the second member 1240 via the contact portion 1252 in the stroke direction. Then, the driving unit causes the contact portion 1252 to move in a separated direction from the combustion chamber 1132 such that the contact portion 1252 and the contact target portion 1222 are separated from each other in the stroke direction, and thereby the apex 1212a of the first member 1210 shift from the meshing position (refer to FIGS. 13A and 15A) at which the apexes mesh with the bottom portions 1242b of the second member 1240 to the meshing position (refer to FIGS. 14B and 15B) at which the apexes mesh with the bottom portions 1242c of the second member 1240. In this manner, a height H of the first member 1210 and the second member 1240 increases by a width D as a difference in depth of the bottom portion 1242c from the apex 1242a. In other words, the first member 1210 projects from the second member 1240 to the combustion chamber 1132 side by the width D as the difference in depth of the bottom portion 1242b and the bottom portion 1242c from the apex 1242a. As described above, the stroke position of the piston 1112 changes and it is possible to change the compression ratio from the low compression ratio to the high compression ratio.

As described above, in the variable compression ratio mechanism 1200 according to the embodiment, only the contact target portion 1222 is pressed in the stroke direction, and then it is possible to rotate the second member 1240. Therefore, the actuator for rotating the second member 1240 does not need to be embedded in the piston 1112, and thus it is possible to simplify the shape of the piston 1112. As described above, it is possible to reduce an increase in the manufacturing costs of the piston 1112.

In addition, since the second member 1240 rotates during a period when the contact target portion 1222 presses the contact portion 1252, that is, while the first member 1210 is separated from the second member 1240, the shear force does not act in the rotating direction while the tooth portions 1212 of the first member 1210 mesh with the meshing portions 1242 of the second member 1240. Hence, the first member 1210 and the meshing portions 1242 may not have very high stiffness such that it is possible to reduce an increase in costs of materials.

Further, although the variable compression ratio mechanism 1200 of the embodiment has only a simple configuration in which the contact target portion 1222 is pressed or the pressing is released, it is possible to separate the first member 1210 from the second member 1240, and to perform rotation of the second member 1240. Therefore, it is possible to change the compression ratio of not only the uniflow scavenging two-cycle engine 1100, but also a four-cycle engine. Note that, the four-cycle engine has not only a period when the force is applied from the combustion chamber 1132 to the crankshaft 1118, but also a period when the force is applied from the crankshaft 1118 to the combustion chamber 1132. Hence, in a case where the variable compression ratio mechanism 1200 of the embodiment is applied to the four-cycle engine, a structure in which the first member 1210 is not separated from the second member 1240 may be employed. For example, the first member 1210 may be biased to the second member 1240 with an elastic member such as a spring.

In addition, it is possible to change the compression ratio at all times, during driving of the engine, during stopping of the engine, and regardless of the strokes during the driving of the engine.

Note that it is possible to change the compression ratio; however, the change is performed when the piston 1112 reaches the bottom dead center, that is, when the piston 1112 reaches the bottom dead center, the driving unit 1230 causes the contact portion 1252 to approach the contact target portion 1222 such that both come into contact with each other, and causes the contact portion 1252 to be separated from the contact target portion 1222 in the stroke direction after the pressing force is applied to the second member 1240 in the stroke direction via the contact portion 1252.

Since the minimum force is applied to the second member 1240 from the combustion chamber 1132 to the crankshaft 1118 when the piston 1112 reaches the bottom dead center, the pressing force from the driving unit 1230 to the contact target portion 1222 can be minimized. Hence, the compression ratio is changed when the piston 1112 reaches the bottom dead center, and thereby it is possible to reduce the driving force of the driving unit 1230 and it is possible to reduce operation costs of the driving unit 1230.

In addition, the variable compression ratio mechanism 1200 may change the compression ratio depending on the operation mode or may change the compression ratio depending on a load of the engine.

Further, the dimensional relationship between the tooth portion 1212 of the first member 1210, the tooth member 1224 of the contact target portion 1222, the meshing portion 1242 of the second member 1240, and the meshing member 1254 of the contact portion 1252 is set as described above, and thereby it is possible to cause the contact portion 1252 (second member 1240) not only to rotate with the pressing force of the contact target portion 1222 shown in FIG. 13C, but also to cause the second member 1240 (contact portion 1252) to further rotate, as shown in FIG. 14A. The additional rotation makes it possible to maintain the constant relative positional relationship between the first member 1210 and the second member 1240 at all times. Hence, whenever the contact target portion 1222 presses the contact portion 1252, it is possible to shift, by one tooth, a position at which the tooth portions 1212 of the first member 1210 meshes with the meshing portions 1242 of the second member 1240. As described above, since the second member 1240 of the embodiment have the bottom portions 1242b and 1242c which are alternately provided, that is, the meshing depths of the first member 1210 and the second member 1240 are alternately different by one tooth at the meshing position, it is possible to change the meshing position with the pressing by the contact target portion 1222 once.

(Modification Example)

In the embodiment described above, the variable compression ratio mechanism 1200 that is capable of changing the compression ratio in two steps is described above. However, in the variable compression ratio mechanism, it is possible to change the compression ratio in three or more steps, by devising the tooth portion of the first member and the meshing portion of the second member.

Figure 16:
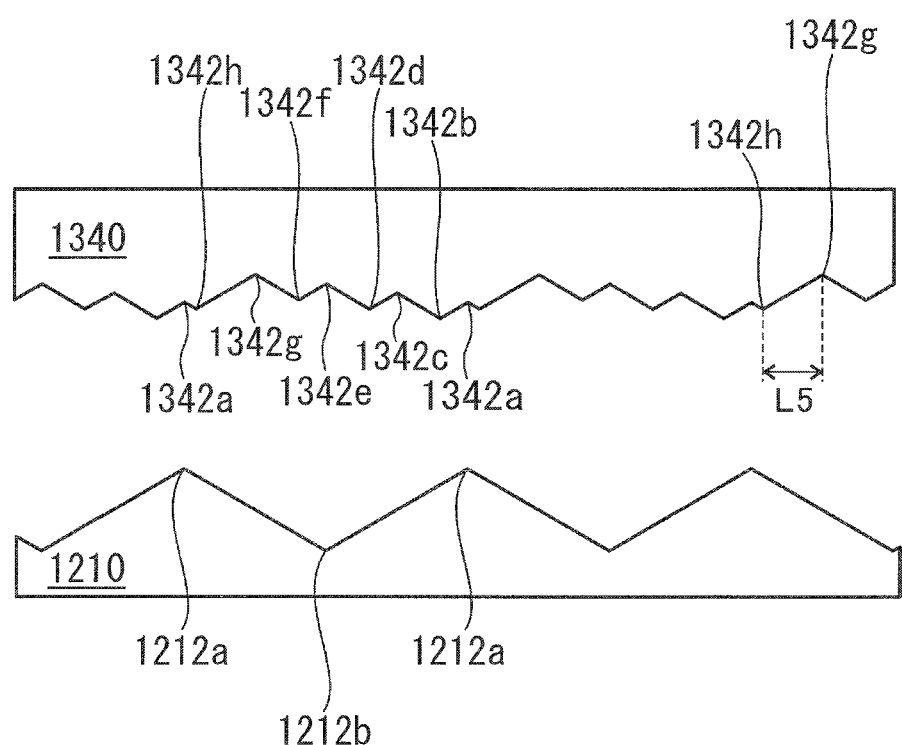
FIG. 16 is a view showing a second member of a variable compression ratio mechanism according to a modification example.

FIG. 16 is a view showing a second member 1340 of the variable compression ratio mechanism 1200 according to a modification example. As shown in FIG. 16, the meshing portion 1342 of the second member 1340 is configured to have four apexes 1342*b*, 1342*d*, 1342*f*, and 1342*h*, and four bottom portions 1342*a*, 1342*c*, 1342*e*, and 1342*g*, which have different depths from the apex 1342*b* disposed to be closest to the first member 1210 side. By designing the meshing portions 1342 in this manner, it is possible to change the compression ratio in four steps.

Note that, in this case, the distance L1 between the apexes 1254*a* of the contact portion 1252 in the rotating direction may be determined, based on the longest distance of a distance L5 between the bottom portion 1342*g* and the apex 1342*h* in the rotating direction, that is, the distance between the bottom portion and the apex of the meshing portion 1342 of the second member 1340 in the rotating direction.

Note that, in the embodiment described above, an example of the configuration in which the driving unit 1230 causes the contact target portion 1222 to move is described above. However, the driving unit 1230 may cause the contact portion 1252 and the contact target portion 1222 to approach each other in the stroke direction such that both come into contact with each other, and may cause the contact portion 1252 and the contact target portion 1222 to be separated from each other in the stroke direction after the pressing force is applied to the second member 1240 in the stroke direction via the contact portion 1252. For example, the driving unit 1230 may cause the contact portion 1252 to move or may cause the contact portion 1252 and the contact target portion 1222 to move.

In addition, in the embodiment described above, an example of the case where the contact target portion 1222 is provided outwardly in the radial direction from the tooth portion 1212 of the first member 1210 is described above. However, the contact target portion 1222 may be provided in the circumferential direction of the first member 1210. For example, the contact target portion 1222 may be provided inwardly in the radial direction from the tooth portion 1212 of the first member 1210.

In addition, in the embodiment described above, an example of the case where the contact portion 1252 is provided outwardly in the radial direction from the meshing portion 1242 of the second member 1240 is described above. However, the contact portion 1252 may be provided in the circumferential direction of the second member 1240. For example, the contact portion 1252 may be provided inwardly in the radial direction from the meshing portion 1242 of the second member 1240.

In addition, in the embodiment described above, an example of the configuration in which the apexes 1212*a* of the first member 1210 have a constant height, the depths of the bottom portions 1242*b* and 1242*c* (a distance from the apex 1212*a* of the first member 1210) of the second member 1240 are caused to be different from each other, and thereby the meshing depths between the tooth portions 1212 and the meshing portions 1242 are different from each other is described above. However, as long as it is possible to cause the meshing depths of the tooth portions 1212 and the meshing portions 1242 to be different from each other, there is no limitation to the configuration. For example, the apexes 1242*a* of the second member 1240 may have a constant height, the depths of the bottom portions 1212*b* of the first member 1210 may be caused to be different from each other, and thereby the meshing depths between the tooth portions 1212 and the meshing portions 1242 may be caused to be different from each other is described.

In addition, in the embodiment described above, an example of the configuration in which the tooth portion 1212 and the meshing portion 1242 have inclined surfaces 1212*c* and 1242*d* to 1242*g* is described above. However, the tooth portion 1212 and the meshing portion 1242 may not have the inclined surface. In this case, when the driving unit 1230 causes the contact portion 1252 and the contact target portion 1222 to come into contact with each other in a state in which second member 1240 is disposed at the meshing position, the second member 1240 moves from the meshing position to the non-meshing position with the pressing force in the stroke direction, and the second member 1240 rotates with the component force applied in the rotating direction such that the relative rotating position with respect to the first member 1210 changes, when the meshing relationship between the tooth portion 1212 and the meshing portion 1242 is released.

In addition, in the embodiment described above, an example of the configuration in which the meshing member 1254 of the contact portion 1252 and the tooth member 1224 of the contact target portion 1222 have the inclined surfaces 1224*c* and 1254*c* is described above. However, the inclined surface having the inclined angle in the rotating direction of the second member 1240 may be provided at least one of the contact portion 1252 and the contact target portion 1222.

In addition, in the embodiment described above, an example of the configuration in which the first member 1210 and the second member 1240 of the variable compression ratio mechanism 1200 are provided in the piston 1112 is described above. However, the first member 1210 and the second member 1240 may be provided in the piston rod 1112*a* or the crosshead 1114.

As described above, the embodiment of the present disclosure is described with reference to the accompanying figures; however, it is needless to say that the present disclosure is not limited to the embodiment. It is obvious for those skilled in the art to conceive various modification examples or alteration examples within the range of the claims, and thus it is understood that the examples are included within the technical scope of the present disclosure.

INDUSTRIAL APPLICABILITY

The present disclosure can use an engine in which a compression ratio is variable.

What is claimed is:

1. A uniflow scavenging two-cycle engine that includes an exhaust port formed on a first end of a cylinder in which a piston is reciprocating and a scavenging port formed on a second end of the cylinder, and that switches between at least two operation modes of a low compression ratio mode and a high compression ratio mode in which top dead center and bottom dead center of the piston are positioned to be closer to the exhaust port than in the low compression ratio mode, wherein the scavenging port has:
- a swirling guide portion that includes an opening in a direction inclined with respect to a radial direction of the cylinder, and that extends in the direction inclined with respect to the radial direction of the cylinder, and which guides scavenging gas from an outside to an inside of the cylinder in the direction inclined with respect to the radial direction of the cylinder, and
- a center guide portion that is located closer to the second end of the cylinder than the swirling guide portion, that includes an opening toward a center of the cylinder, and that extends in the radial direction of the cylinder, and which guides the scavenging gas further toward the center of the cylinder than the swirling guide portion, and wherein at least a part of the center guide portion faces the piston in a case where the piston is positioned at bottom dead center during the high compression ratio mode, and the center guide portion and the piston do not face each other or an area of facing the piston is smaller than that during the high compression ratio mode in a case where the piston is positioned at bottom dead center during the low compression ratio mode.

2. The uniflow scavenging two-cycle engine according to claim 1, comprising:
   a first fuel supply unit that injects a gaseous fuel to the scavenging gas in the low compression ratio mode; and
   a second fuel supply unit that injects a liquid fuel into the cylinder on the first end of the cylinder rather than the first fuel supply unit in the high compression ratio mode.

* * * * *